US006885406B2

(12) United States Patent
Yui et al.

(10) Patent No.: US 6,885,406 B2
(45) Date of Patent: Apr. 26, 2005

(54) APPARATUS AND METHOD FOR CONTROLLING DISPLAY OF IMAGE INFORMATION INCLUDING CHARACTER INFORMATION, INCLUDING APPROPRIATE SIZE CONTROL OF A DISPLAY WINDOW

(75) Inventors: Hideaki Yui, Kanagawa (JP); Takashi Tsunoda, Kanagawa (JP); Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 09/996,884

(22) Filed: Nov. 30, 2001

(65) Prior Publication Data

US 2002/0067433 A1 Jun. 6, 2002

(30) Foreign Application Priority Data

Dec. 1, 2000 (JP) ........................................ 2000-367259

(51) Int. Cl.$^7$ ................................................ H04N 5/45
(52) U.S. Cl. ........................ 348/564; 348/565; 348/468
(58) Field of Search ................................ 348/468, 569, 348/564, 589, 600, 598, 565, 239; 345/629, 660, 788, 800, 801, 792; 382/176, 199, 200, 269

(56) References Cited

U.S. PATENT DOCUMENTS

| | | | | |
|---|---|---|---|---|
| 4,992,955 A | * | 2/1991 | Yabuuchi et al. | 345/428 |
| 5,610,664 A | * | 3/1997 | Bobert | 348/564 |
| 5,721,570 A | | 2/1998 | Tsunoda et al. | 345/213 |
| 5,734,436 A | | 3/1998 | Abe et al. | 348/564 |
| 5,774,189 A | * | 6/1998 | Ishii et al. | 348/563 |
| 5,790,204 A | | 8/1998 | Yamaguchi | 348/564 |
| 6,552,750 B1 | * | 4/2003 | Suen et al. | 348/561 |

FOREIGN PATENT DOCUMENTS

| | | |
|---|---|---|
| JP | 9-93505 | 4/1997 |
| JP | 9-93548 | 4/1997 |

* cited by examiner

*Primary Examiner*—Victor R. Kostak
(74) *Attorney, Agent, or Firm*—Fitzpatrick, Cella, Harper & Scinto

(57) ABSTRACT

A multi-window display apparatus is provided with such characteristics that, when a data telecast window is displayed as one window of multi-window display, the user can view the screen with improved visibility of a character area of the data telecast and the multi-window display, without disturbing the "standardized presentation" of the data telecast window intended by a telecast service provider. In scale-down display of the date telecast window, an area of character telecast display part is discriminated, the area is displayed with focus to facilitate recognition of the character part, and, in response to user's selection of the focus part on a remote controller, the character area is displayed in a scale-up state of original size.

39 Claims, 16 Drawing Sheets

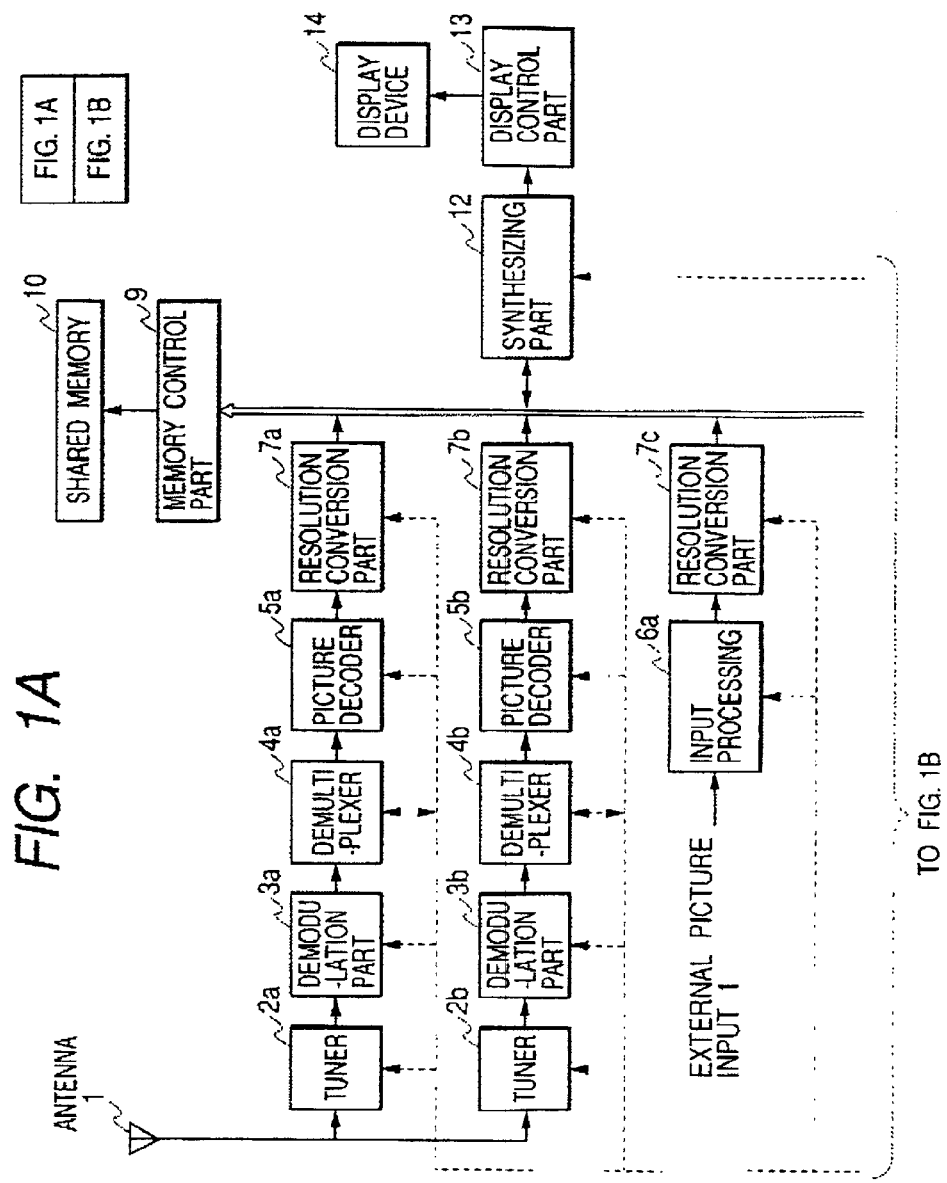

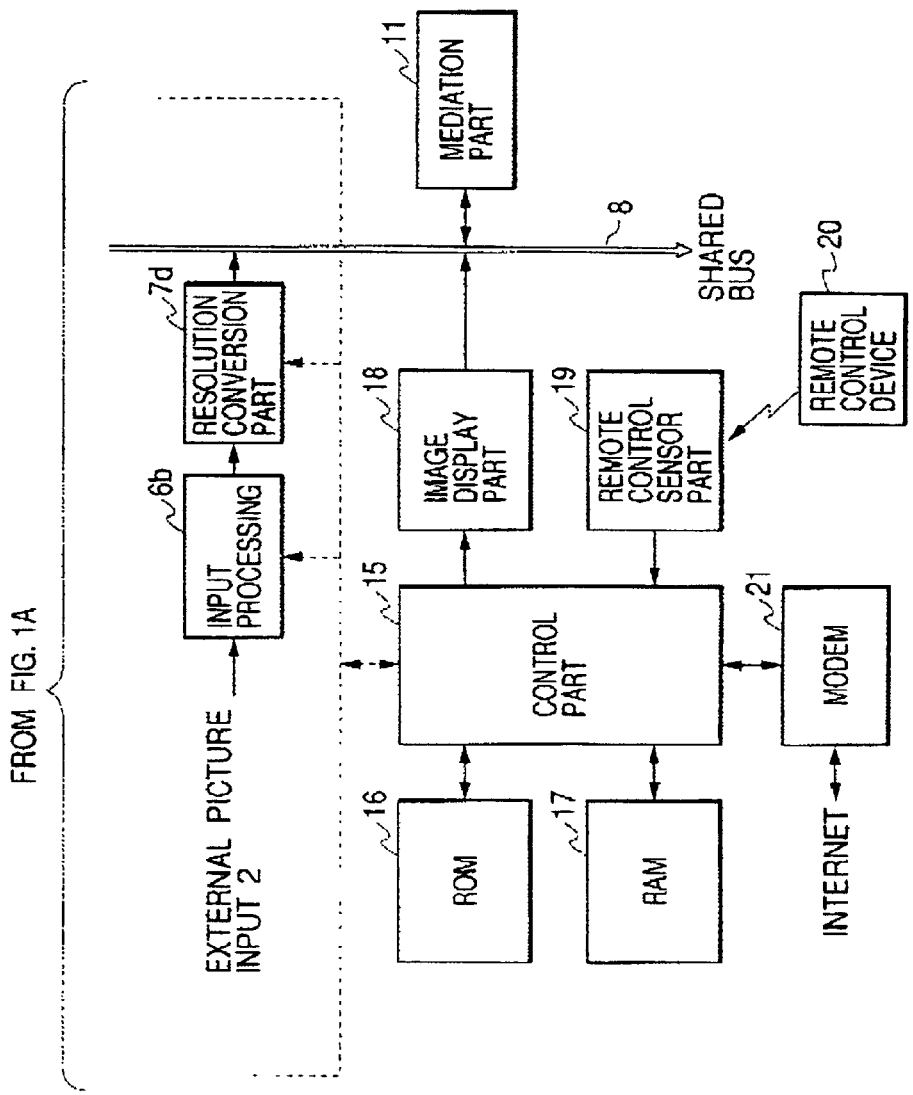

EQUIVALENT DISPLAY OF FOUR WINDOWS WITH GUI

PICTURE-IN-PICTURE DISPLAY OF FOUR WINDOWS WITH GUI

FIG. 9
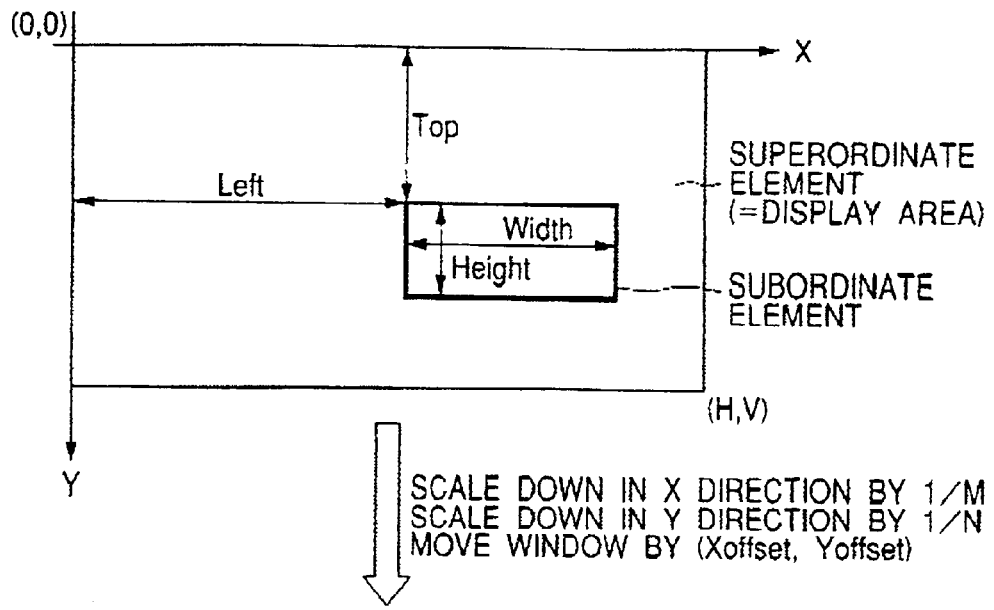
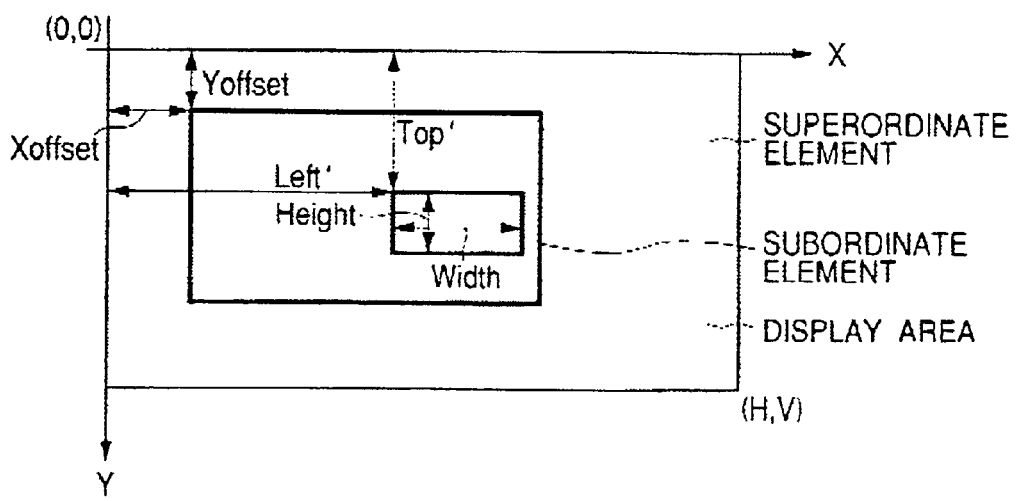

FOCUS A CONTOUR OF CHARACTER AREA BY RED

NOT DISPLAY CHARACTER DATA

SCALE-UP DISPLAY OF CHARACTER AREA

APPARATUS AND METHOD FOR CONTROLLING DISPLAY OF IMAGE INFORMATION INCLUDING CHARACTER INFORMATION, INCLUDING APPROPRIATE SIZE CONTROL OF A DISPLAY WINDOW

BACKGROUND OF THE INVENTION

1. Field of the Invention

The present invention relates to a multi-window display apparatus having a multi-window display function, a data telecast receiving apparatus, a multi-window display method, a memory, and a program.

2. Related Background Art

Conventionally, character telecast programming for transmitting character or graphic data multiplexed over normal television broadcasting signals, is implemented as one of broadcasting services in the current analog broadcasting.

Currently available character telecast programs under service include news, weather forecasting, traffic information, travel information, television shopping, and so on. Some programs present questionnaires to viewers during a telecast. This current character telecast programming is done in a method of providing one-way information from a television station to viewers.

However, BS digital broadcasting becoming available at the end of year 2000 in Japan is scheduled to provide the data telecasting with such new services as interactive and on-demand multimedia services added to the character telecasting.

This data telecasting is standardized by Association of Radio Industries and Businesses (ARIB), Japan, and the details of data telecasting are described in the ARIB standard: data telecast encoding and transmission methods in digital broadcasting (ARIB STD B-24). In the standard, the method of presenting the data telecast involves various stipulations to retain "standardized presentation." The "standardized presentation" means that the same presentation as that intended by a telecast service provider is presented in digital television receivers of all makers, which is strongly recommended.

On the other hand, there are recent television receivers provided with a multi-window display function, e.g., those with a function capable of simultaneously receiving two channels and simultaneously displaying them on a screen.

However, in order for the foregoing digital televisions (digital telecast receiving apparatus) with the multi-window display function to adapt to the presentation of data telecasting, it becomes necessary to modify the window size and layout originally intended by the telecast service provider: for example, it is necessary to convert a window into a scale-down display window.

The reason is nothing but that the data telecast presentation is considered on the basis of display over a full screen. In this case, where a data telecast window consists of a mixture of multimedia information items including characters, graphics, pictures, etc., the discriminability, particularly, of the character information can be heavily degraded with a high possibility.

Methods for avoiding the above problem is described in Japanese Patent Application Laid-Open No. 09-093548 (television receivers with the character information display function). In this application, an imageless region in the screen of the display device is effectively utilized so as to display the character information decoded by a character multiplexing and data telecast decoder, in the imageless region. Furthermore, in the case of a television signal in the letter box method where there appear upper and lower imageless regions, these imageless regions are gathered to either of the upper or lower region and the character information is displayed in the imageless region so as to facilitate recognition and viewing. Making use of the function of presenting display of two windows, there is provided means for enabling display of the character information on either one window. Further, there is another known means of always automatically setting a window for display of character information at a fixed position, as described in Japanese Patent Application Laid-Open No. 09-093505 (a television receiver with a character multiplex decoder). This method can be an effective method for the character telecasting in the current analog broadcasting.

However, when consideration is given to the multi-window display retaining the standardized presentation of data telecast, changing the layout of the character part while ignoring the standardized presentation as in the above avoidance methods, deviates from the intention of the broadcast service provider, and there are thus desires for further improvement.

SUMMARY OF THE INVENTION

It is, therefore, an object of the present invention to provide a multi-window display apparatus, a data telecast receiving apparatus, a multi-window display method, a memory, and a program capable of improving the visibility of the character area of data telecast and the multi-window display for users without disturbing the "standardized presentation" of the data telecast window intended by the telecast service provider, where the data telecast window is displayed as one of windows in the multi-window display.

In order to accomplish the above object, a multi-window display apparatus of the present invention is a multi-window display apparatus for accepting input of a plurality of image data and combining windows corresponding to the respective image data to present multi-window display thereof, which comprises identifying means for identifying a character information area in a said window; contour area extracting means for extracting a contour area of the character information area thus identified; and display changing means for changing a display mode of the character information area in said extracted contour area when said window is displayed in a scale-down state equal to or less than a predetermined size as one of window elements of said multi-window display.

Further, a data telecast receiving apparatus of the present invention is a data telecast receiving apparatus for accepting input of a plurality of image data from a plurality of picture sources including a data telecast and combining windows corresponding to the image data to present multi-window display thereof, which comprises identifying means for identifying a character information area in a data telecast window; contour area extracting means for extracting a contour area of the character information area thus identified; and display changing means for changing a display mode of the character information area in said extracted contour area when said data telecast window is displayed in a scale-down state equal to or less than a predetermined size as one of window elements of said multi-window display.

A multi-window display method of the present invention is a multi-window display method of accepting input of a plurality of image data and combining windows corresponding to the image data to present multi-window display thereof, which comprises a step of identifying a character information area in a said window; a step of extracting a contour area of the character information area thus identified; and a step of changing a display mode of the character information area in said extracted contour area when said window is displayed in a scale-down state not more than a predetermined size as one of window elements of said multi-window display.

BRIEF DESCRIPTION OF THE DRAWINGS

FIG. 1 which described of FIGS. 1A and 1B is a block diagram showing a configuration of a data telecast receiving apparatus in the first embodiment;

FIG. 9 is a diagram showing absolute coordinate transformation in layout change of the data telecasting window;

DETAILED DESCRIPTION OF THE PREFERRED EMBODIMENTS

Figure 2:
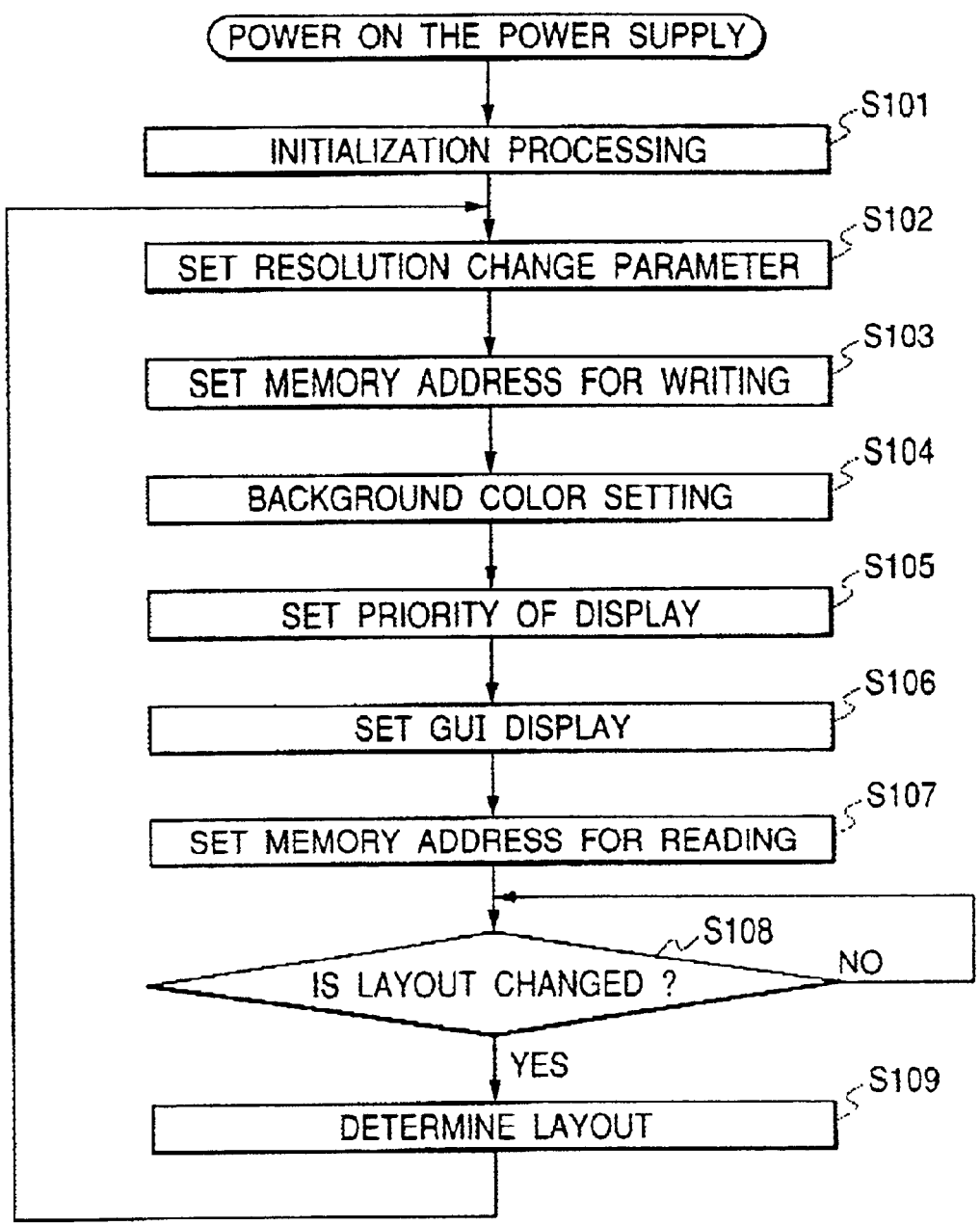
FIG. 2 is a flowchart showing a processing procedure of multi-window display operation.

Embodiments of the present invention will be described below with reference to the drawings.

First Embodiment

FIGS. 1A and 1B are block diagrams showing a configuration of a data telecast receiving apparatus in the first embodiment.

In FIGS. 1A and 1B, numeral 1 designates an antenna (parabolic antenna), which receives BS digital broadcasting and CS digital broadcasting.

Symbols 2a and 2b denote tuners, each of which is configured to pass a received signal through a band pass filter, a downconverter, or the like and output a resultant signal to a demodulation part 3a or 3b. Each demodulator 3a, 3b effects demodulation processing matching a transmission mode, error correction processing and others on the received signal and outputs a desired MPEG2 transport stream to a demultiplexer 4a or 4b.

Each demultiplexer 4a, 4b separates MPEG2 picture data, MPEG2 audio data, and additional information of a desired program from the transport stream. The MPEG2 audio data thus separated is decoded in an audio decoder (not shown) to be outputted as an audio signal. By connecting an amplifier and loudspeakers thereto, a viewer can listen to the audio of the received program.

The MPEG2 picture data separated is decoded in a picture decoder 5a or 5b to be converted into a display format of the raster scan method and thereafter it is outputted as a telecast picture, source to a resolution conversion part 7a or 7b.

Further, the separated additional information is transferred to a control part 15. When this additional information is data telecasting which is scheduled to go into service in the BS digital broadcasting, the control part 15 interprets the BML script language to obtain a contents scenario of a multimedia information service provider.

This scenario consists of attributes of structured contents (individual data of text, still picture, motion picture, audio, and the like, control information designating locations of these individual data on the screen, screen control information for renewing the screen according to operation of buttons and others, etc.).

The control part 15 interprets the attributes of the contents and constructs a data telecast window in cooperation with image drawing part 18 described hereinafter and the picture decoder 5a, 5b.

When the additional information is Electrical Program Guide (EPG) information, the control part 15 interprets PSI/SI information to obtain program information (e.g., programs, telecasting hours, titles, categories, etc.).

Here the data telecasting will be described briefly. With development of digital technology, broadcasting systems to provide various digital information including telecast signals have also been developed in the broadcasting field, and among them is a new transmission method called data carousel transmission. This is a method of repeatedly transmitting contents files of multimedia service attendant to programs, on the MPEG2 transport stream, and the receiver acquires any contents file at arbitrary timing during telecasting. This permits the user to watch latest news, a weather forecast, results of professional baseball games, etc. at any convenience on demand. Since the receiver incorporates a telephone function through a modem, it is feasible to implement interactive service while connecting the user with a telecast station which permits the user to take part in a quiz program, a popularity poll program of movies, and so on.

Numerals 6a and 6b denote input processing parts, each of which receives a picture input source from the outside. When the received data is an analog signal from a computer, each input processing part 6a, 6b incorporates an A/D converter and a Phase Locked Loop (PLL) for sampling image data. When the received data is a digital signal of Low Voltage Differential Signaling (LVDS) or the like, each input processing part 6a, 6b incorporates a decoder thereof and a differential buffer. Further, when the received data is a composite signal of TV or DVD, each input processing part 6a, 6b incorporates an NTSC video decoder, a color conversion circuit for converting YUV signals to RGB signals, an IT conversion circuit for converting interlace scanning to progressive scanning, and so on. In either case, the received data is converted into the display format of the raster scan method and thereafter the data is transferred as an external picture source to a post-stage resolution conversion part 7c or 7d.

Each resolution conversion part 7a to 7d performs scale-up, scale-down, and 1:1 processes while the control part 15 independently sets a resolution conversion parameter (a scale-up rate, a scale-down rate, weighting filter coefficients for scale-up or scale-down, etc.) for each resolution conversion part, based on the display format (the number of display lines, the number of dots, the number of colors) and the preset multi-window layout information. In the present embodiment, the resolution conversion parts 7a to 7d also have a function of a bus interface for outputting four independent image data to one common shared bus 8.

Images outputted from the resolution conversion parts 7a to 7d are stored via the shared bus 8 into a shared memory 10, which is managed under control of memory control part 9 and which has a capacity enough for at least one display image window (in the present embodiment, at least four display image windows).

At the same time as it, a synthesizing part 12 issues memory addresses in the memory of the input images to be displayed, to the memory control part 9 in response to a multi-window management instruction from the control part 15, thereby reading the display data from the shared memory 10 and implementing final multi-windows synthesis. Accesses to the memory, which asynchronously occur through the shared bus 8, are managed in scalable fashion by mediation part 11, based on their priorities.

A display control part 13 performs control of display driving and conversion of display format according to characteristics of a display device 14 in synchronism with the frame rate of the display device 14. The display device 14 may be any device that can display an image, without being limited to flat panels having the matrix electrode structure (liquid crystal displays, plasma displays, etc.) and CRTs. In the present embodiment, a high vision display is employed in the case of television, and a large screen display capable of displaying high definition images of SXGA or higher is employed in the case of PC.

Numeral 15 designates the control part for controlling the whole system, which incorporates a CPU having arithmetic performance, a counter for counting the time, peripheral I/O interfaces, and so on. Connected to a CPU bus in the control part 15 are RAM 17 for temporarily saving data, and ROM 16 for storing control programs.

The control part 15 may be constructed of only a logic circuit or of a CPU or a media processor capable of parallel processing. The control programs may be stored in the ROM 16 or may be transferred through the peripheral I/O interface from the outside. The ROM 16 also stores character fonts and others as occasion demands, which are used when character information of WWW or data telecasting is expanded on a window.

A modem 21 is connected to the control part 15 to permit connection to Internet. The Internet connection is not used only for browsing and electronic mail, but also used for interactive communications of data telecasting. A remote controller light-receiving part 19 is also connected to the control part 15, so as to be able to accept a command from a remote controller 20 through use of infrared light. This remote controller 20 does not always have to be limited to only the normal remote controller, but may also be a keyboard, a mouse, a joystick, or the like capable of emitting infrared light.

Numeral 18 indicates an image drawing part, which is used for generation of an On Screen Display (OSD) window, an electronic program guide (EPG) window, and a Graphical User Interface (GUI) window such as a data telecast window or the like in the shared memory 10 by use of an acceleration function such as BitBlt, DMA, or the like when the control part 15 issues a drawing command.

The operation of the data telecast receiving apparatus having the above structure will be described below.

(Multi-window Display Operation)

FIG. 2 is a flowchart showing the processing procedure of multi-window display operation. This processing program is stored in the ROM 16 and is executed by the CPU in the control part 15. When the control part 15 detects a power-on signal of power supply, it starts processing to carry out initialization processing (step S101).

In this initialization processing, the CPU acquires initial window layout information (information about a start point and an end point for each of windows to be displayed, information about display priorities in the case of overlapping windows, etc.) from the ROM 16 and, in the case of a telecast picture source, the CPU determines the source format and default selection channels. In accordance therewith, the CPU effects initial setting in the tuners 2a, 2b, demodulators 3a, 3b, demultiplexers 4a, 4b, and picture decoders 5a, 5b. For the external picture sources, the CPU detects types of the external picture sources and performs initial setting of parameters for receiving the external picture sources in the input processing parts 6a, 6b in accordance therewith.

Based on the window layout information acquired at step S101, the CPU calculates horizontal and vertical scale-up or scale-down rates of each picture source, determines resolution conversion parameters, and then sets the parameters in the respective resolution conversion parts 7a, 7b (step S102).

The CPU then sets memory addresses for writing necessary for writing of output of each resolution conversion part 7a, 7b in the shared memory 10 (step S103).

Figure 3:
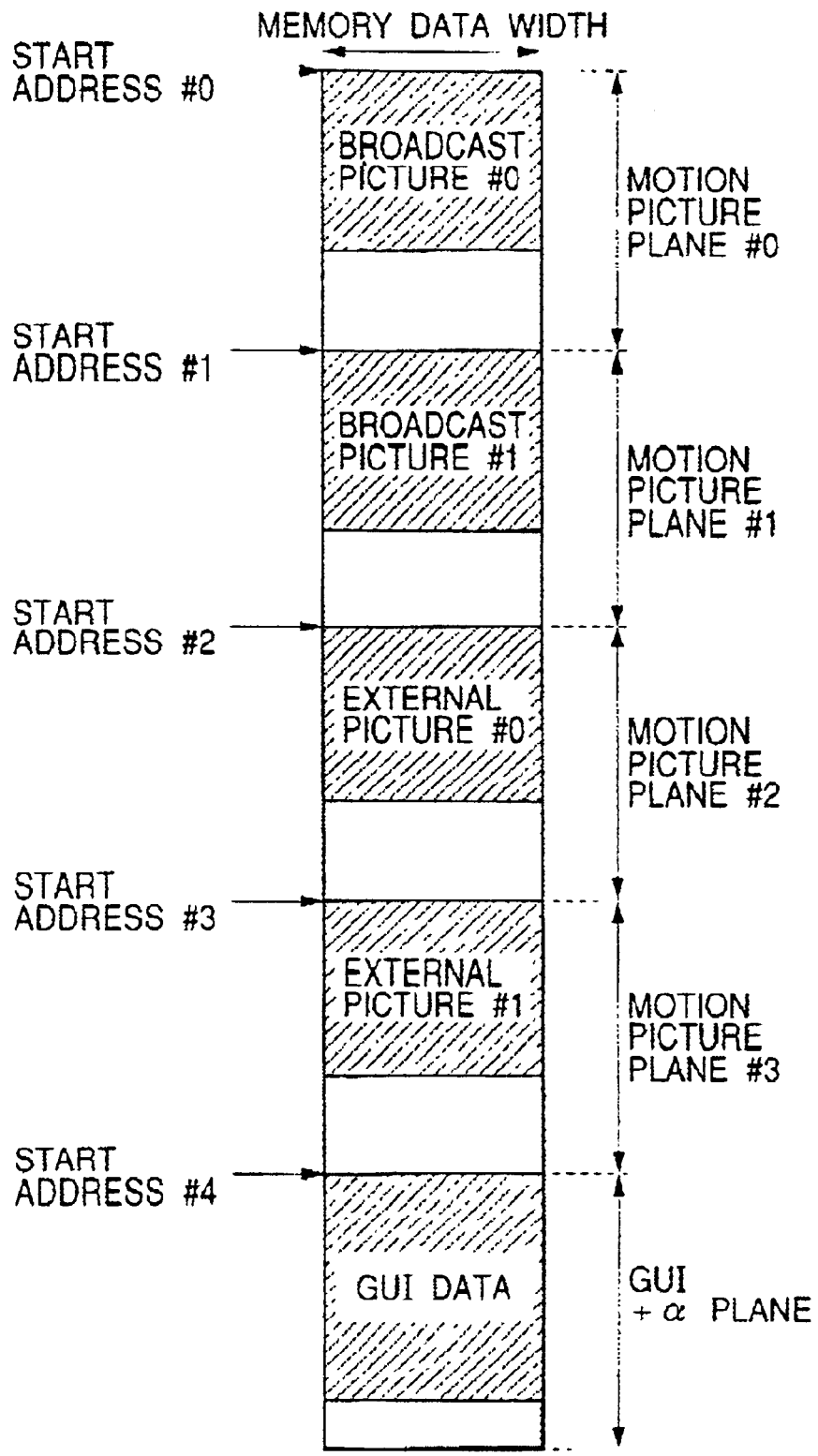
FIG. 3 is a diagram showing a logical address map of a memory.

FIG. 3 is a diagram showing a logical address map of the memory. In the present embodiment, the shared memory 10 is composed of totally five planes, four motion picture planes and one plane of GUI+α (α value) for GUI data. A memory space equivalent to the display resolution of the display device 14 is assigned to each plane. Accordingly, synthesis for display is not implemented at the time of writing into the shared memory 10. Here start addresses #0 to #4 of FIG. 3 are mainly transferred to each of the resolution conversion parts 7a, 7b and the image drawing part 18 and are used as offset values of memory addresses in writing address generators provided in these parts.

The CPU sets a background color (or pattern) in the multi-window display, in the synthesizing part 12 (step S104). The CPU also sets the display priorities acquired at step S101, in the synthesizing part 12 (step S105). However, the GUI+α plane has the highest priority.

The CPU then performs display setting of GUI for multi-window control (step S106). This GUI includes all the windows drawn by the control part 15, such as the Web window, the EPG window, the data telecast window, and so on. Specifically, the control part 15 issues a drawing command for drawing of GUI to the image drawing part 18 to write in the shared memory 10 characters and other data expanded in the bitmap format through use of the accelerating function such as DMA, BitBlt, or the like of the image drawing part 18, thereby constructing the window.

In this drawing operation of GUI data, not only the GUI data, but the mask data called the alpha value is also drawn simultaneously in the shared memory 10. This is for the purpose of implementing synthesis of nonrectangular GUI data, alpha blending of GUI and motion picture, and so on.

After that, the CPU performs various settings for operating the synthesizing part 12, such as setting of memory addresses for readout, and the like (step S107).

The schematic operation of the synthesizing part 12 will be described below. The synthesizing part 12 has a horizontal pixel counter and a vertical line counter of a display area on the basis of the horizontal and vertical synchronizing signals of the display device 14 to count scanning of the raster scan method in the display period. In accordance with the count values, the synthesizing part then constantly generates the readout address of the GUI+α plane to the memory control part 9. The start address #4 of FIG. 3 is designated as the start address of the readout address. By this, the GUI data with the α value is read out.

On the other hand, based on the window layout information (coordinates of the start point and end point in the above display area for each of the broadcast picture #0, broadcast picture #1, external picture #0, and external picture #1) set by the control part 15, the synthesizing part generates the readout address of the corresponding motion picture plane area of FIG. 3 when the aforementioned counters coincide with the area of each picture source.

If readout requests are concurrent with each other, the synthesizing part selects readout of a picture source with the highest priority according to the display priority information set by the control part 15, and does not generate the readout addresses except for it. When the synthesizing part determines that there is no data to be synthesized, it outputs the background data set by the control part 15, without generating any readout address. This results in reading the picture data corresponding to the display layout and thus implementing synthesis of picture data.

Figure 4A:
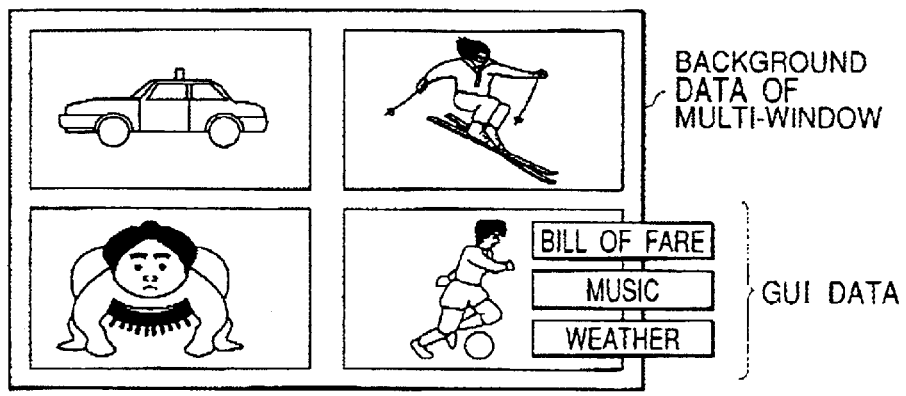
FIGS. 4A and 4B are diagrams showing images upon initialization of multi-window synthesis.
Figure 4B:
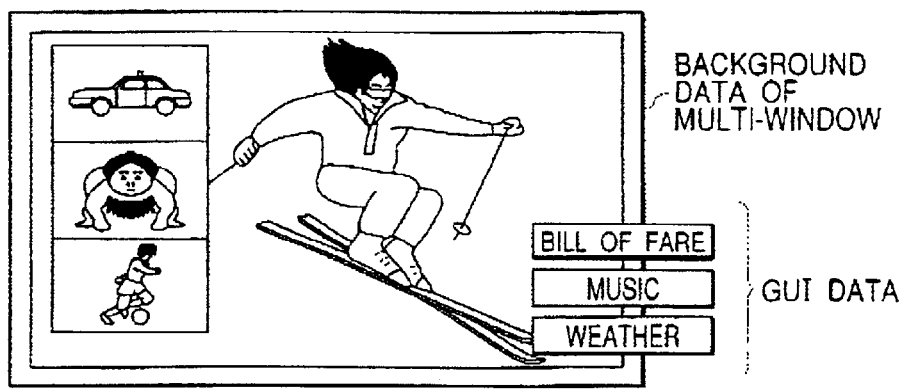

The readout of the GUI data and picture data from the shared memory 10 is alternately carried out in time division and, with the GUI data and the picture data, selection of the GUI data, selection of the picture data, or α blending of the GUI data and the picture data is carried out according to the α value, to be outputted as final multi-window synthetic data to the display control part 13. After this initialization, the image shown in FIG. 4A or 4B is produced as one at initialization of the multi-window synthesis. Each of FIGS. 4A and 4B is a drawing showing an image at the initialization of the multi-window synthesis. FIG. 4A shows an equivalent display image of four windows with GUI. FIG. 4B shows a picture-in-picture display image of four windows with GUI.

After this, the CPU awaits occurrence of layout change (step S108). When there arises a layout change, the CPU determines a layout (step S109) and then returns to the processing at step S102. By repeating the processes at above steps S102 to S107, the layout change of the multi-window display is executed.

(Configuration of Data Telecast Window)

A drawing method of a data telecast window will be described below. In the data telecasting the transmitted information includes various monomedia of motion pictures, audio, and still pictures sent in the stream system and various monomedia of still images, characters, graphics, etc. sent in the carousel system on the MPEG2 transport stream.

Also sent is the multimedia description language called Broadcast Markup Language (BML) for combining the data to implement the multimedia expression intended by the telecast service provider.

In the data telecast receiving apparatus of the present embodiment, the demultiplexer 4a, 4b separates these data and transfers files of the monomedia of the carousel system, BML documents, etc. to the control part 15 to be saved in the RAM 17. The monomedia of the stream system are transferred to the picture decoder 5a, 5b to be decoded there.

For presenting the data telecast window, the control part 15 decodes the monomedia of the carousel system and draws elements of the background, character data, menu buttons, etc., based on the screen layout information described on Cascading Style Sheet (CSS) in the BML description, on the GUI+α plane in the shared memory 10 through use of the function of the image drawing part 18.

Since each of the elements is described with detailed characteristics such as a character size, color, dimensions, size, display position by absolute coordinates, etc., the "standardized presentation" can be retained. Motion pictures such as telecast pictures and the like being the monomedia of the stream system are subjected to scale-up or scale-down processing in the resolution conversion part 7a, 7b, based on the designated layout information, if necessary, and thereafter are drawn on the motion picture plane #0 or on the motion picture plane #1 in the shared memory 10.

Figure 5:
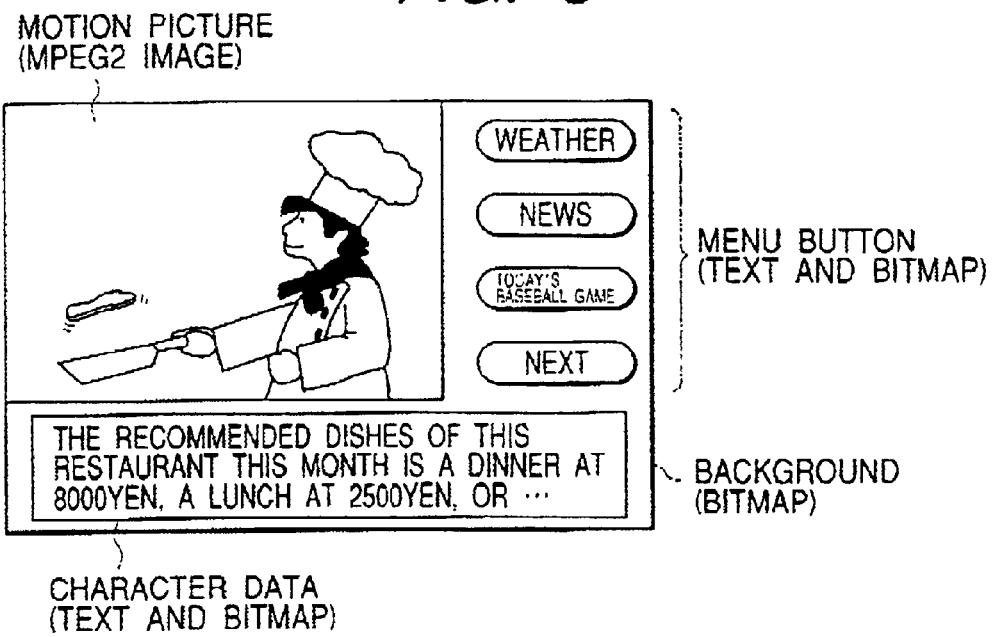
FIG. 5 is a diagram showing a window configuration as a combination of a motion picture with character graphical information.

The foregoing layout information presented for the data telecast window is outputted from the control part 15 to the synthesizing part 12. The synthesizing part 12 properly switches the address to the aforementioned readout address, based on the layout information, to feed it to the memory control part 9, thereby presenting the data telecast window intended by the broadcast service provider, as shown in FIG. 5. FIG. 5 is a diagram showing a window configuration as a combination of a motion picture with character graphic information.

The character graphic information is comprised of character data and menu buttons which can be controlled from the remote controller 20. A special attribute such as a focus property or the like is added to each menu button so as to permit selection from the remote controller 20. When a menu is selected, a next window image is acquired again from the carousel system, the procedure similar to the above is carried out, and thereafter the display is switched to presentation of a new data telecast window. In this way, interactive scenarios of data telecasting are implemented based on the determined procedures.

(Configuration of Data Telecast Window in Multi-window Mode)

The above processing is a general example where the data telecast window intended by the telecast service provider is presented on a full screen of the display device 14. The data telecast receiving apparatus is configured for the purpose of multi-window display of four picture sources at the maximum, as described above.

Figure 6:
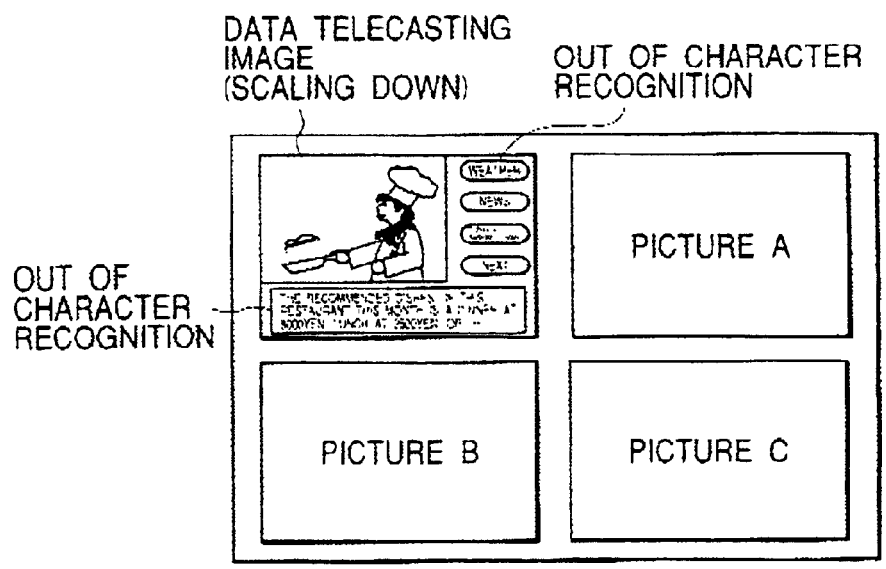
FIG. 6 is a diagram showing a presentation image of a data telecasting window in multi-window display.

Accordingly, consideration has to be given to that the data telecast window can be one component of the multiple windows. FIG. 6 is a diagram showing a presentation image of the data telecast window during the multi-window display. When four windows are independently displayed as in the case of this presentation image of the data telecast window during the multi-window display, the character part in the data telecast window can no longer be expressed in the character size intended by the telecast service provider, so that the viewer cannot discriminate the characters with a high possibility.

Figure 7:
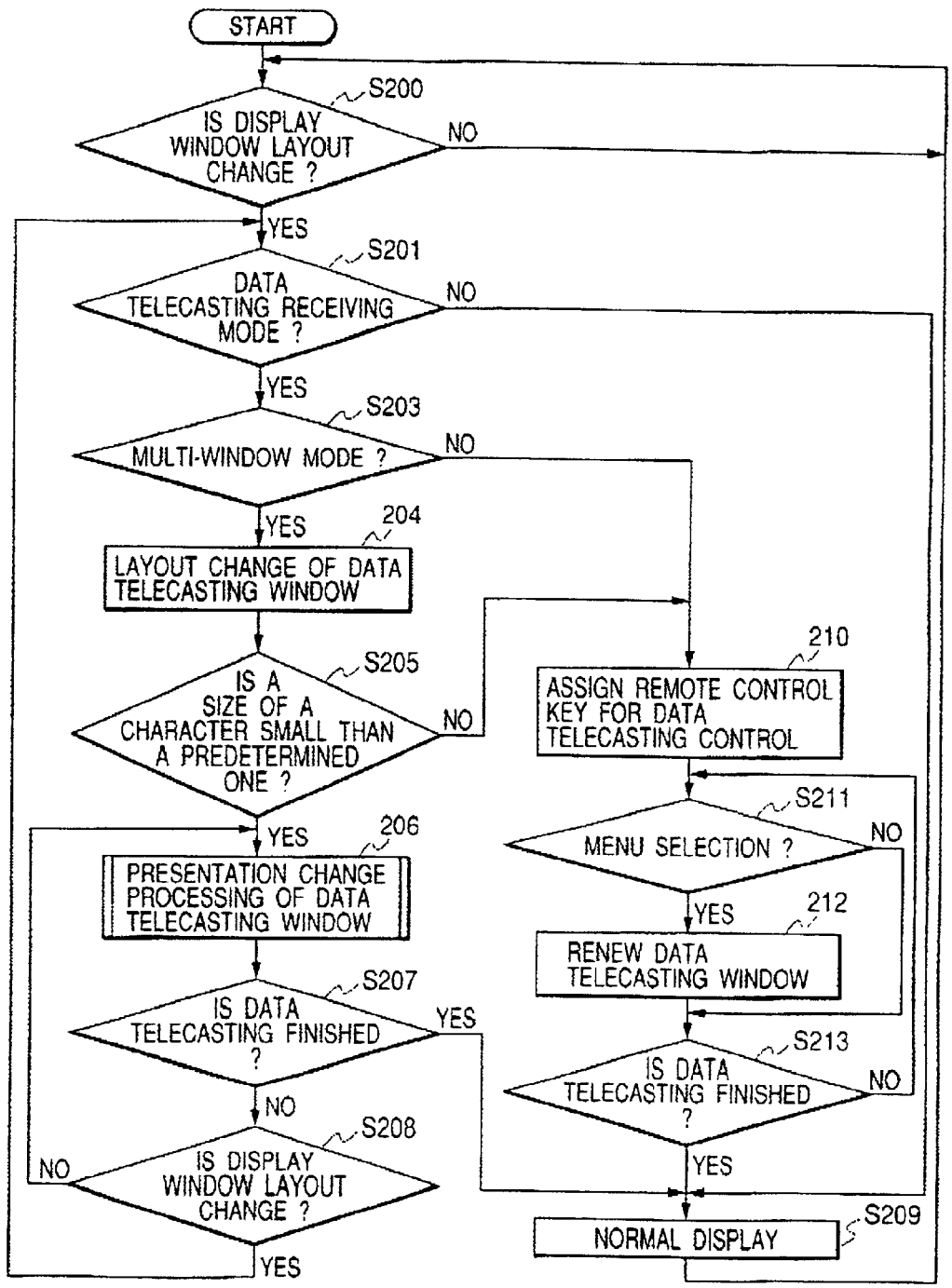
FIG. 7 is a flowchart showing a processing procedure of presentation of data telecasting in multi-window display operation.

The following will describe countermeasures of the present embodiment in such case. FIG. 7 is a flowchart showing the processing procedure of data telecast presentation in the multi-window display operation. This processing program is stored in the ROM 16 and is executed by the CPU in the control part 15. The CPU awaits a layout change of the display window (step S200). When there arises a layout change of the display window, the CPU determines whether the current mode is a data telecast receiving mode (step S201). When the current mode is not the data telecast receiving mode, the CPU sets the normal display of the multi-window presentation (step S209). After this, the CPU returns to the processing at step S200. This setting of the normal display of the multi-window presentation is processed according to the aforementioned flowchart of the display operation processing of FIG. 2.

Figure 8:
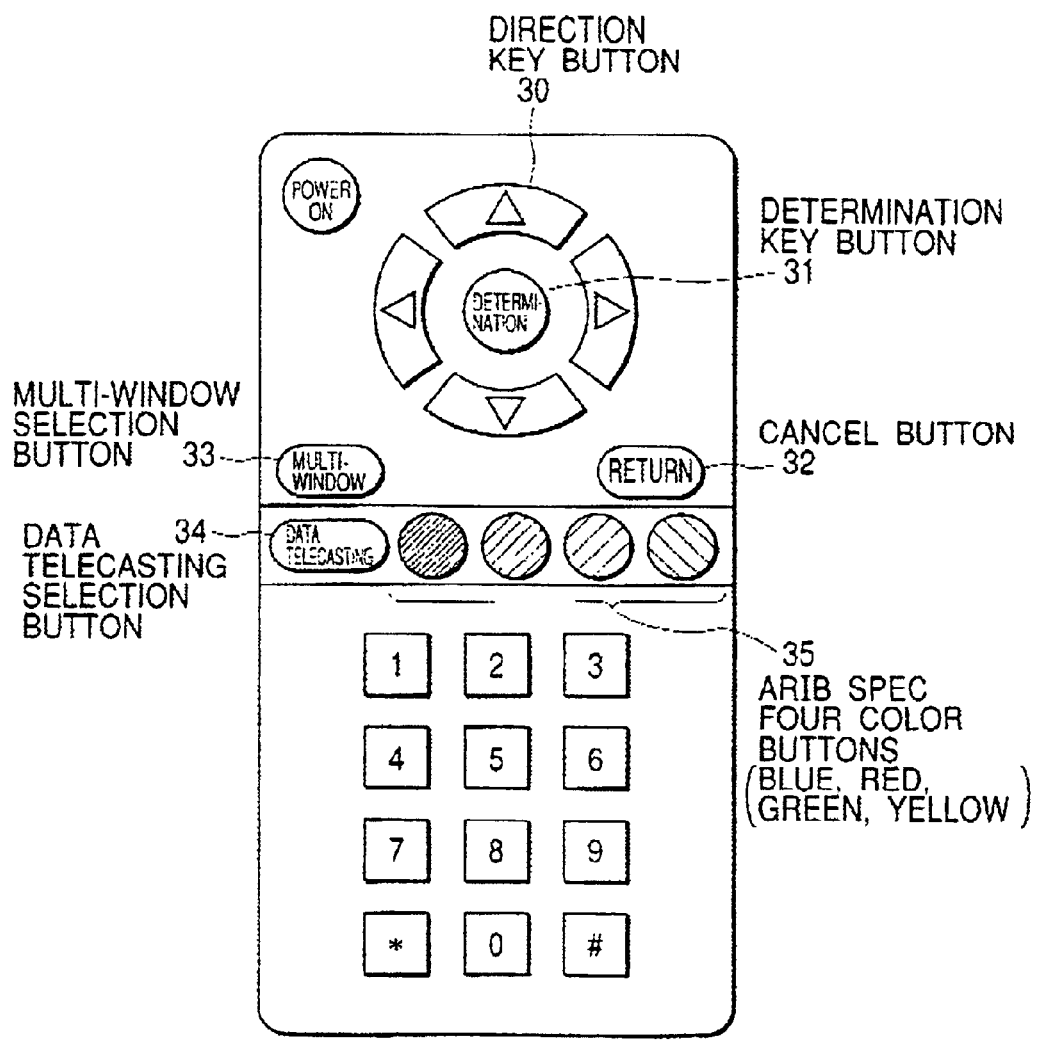
FIG. 8 is a front view showing a key layout of remote controller 20.

When the current mode is judged as the data telecast receiving mode at step S201 on the other hand, i.e., when the user depresses a data telecast select button 34 shown in FIG. 8, using the remote controller 20, the CPU determines whether the current mode is a multi-window display mode (step S203). FIG. 8 is a front view of the remote controller 20 showing the key layout thereof.

When it is determined that the current mode is not the multi-window display mode, i.e., when the current mode is the normal telecast mode of presenting the data telecast on a full screen as shown in FIG. 5, the CPU assigns the remote controller keys for control of data telecasting to those for normal control (step S210). Here the remote controller keys for control of data telecasting include direction key buttons 30, a determination key button 31, and a cancel button 32 and also include, in addition thereto, color buttons 35 of four colors (blue, red, green, and yellow) according to the ARIB spec, which are used in only the data telecasting.

For example, while moving the focus through use of the upper and lower direction key buttons 30 out of the menu buttons shown in FIG. 5, the user can select an objective menu by depressing the determination button 31. When the telecast service provider assigns the colors of the color buttons to the menus for the purpose of permitting simple remote controller operation of menu selection, the user can select a menu by one shot press on a button of a corresponding color out of the color buttons 35. Establishing the interconnection between the keys of the remote controller and the window in this way refers to "assigning the remote controller keys for control of data telecasting to those for the normal control."

It is then determined whether a menu is selected through the keys (step S211). When a menu is selected, new BML is again acquired from transmission in the carousel system to renew the data telecast window (step S212). When no menu is selected, the CPU directly jumps to the processing at step S213. After that, it is determined whether an end of the data telecast is requested (step S213). When the user depresses the data telecast select button 34, the CPU assumes at step S213 that the end of the data telecast is requested, and then returns to the normal display setting to display only the picture part in the stream system of the motion picture in the data telecast at step S209. When the end of the data telecast is not requested at step S213 on the other hand, the CPU returns to the processing at step S211.

When it is determined at step S203 on the other hand that the current mode is the multi-window display mode, i.e., when the user depresses the multi-window select button 33 on the remote controller 20, the data telecast window has to be displayed in a scale-down state, as shown in FIG. 6. For this reason, the layout of the data telecast window is changed (step S204).

FIG. 9 is a diagram showing absolute coordinate transformation on the occasion of the layout change of the data telecast window. The figure shown on the upper side of FIG. 9 shows the data telecast window where the data telecast is displayed on the full screen and in the display resolution intended by the telecast service provider. In FIG. 9, a superordinate element indicates a display area of the entire data telecast window and is in 1:1 correspondence to the display resolution of the display device 14 herein. In the same figure, a subordinate element indicates a drawing area of such elements as character data and menu buttons. In the figure shown on the upper side of FIG. 9, the origin (0, 0) is set at the left upper corner and the superordinate element is defined by a coordinate system of absolute coordinates (H, V) using the number of horizontal pixels (hereinafter referred to as H pixels) and the number of vertical lines (hereinafter referred to as V lines). In the ARIB standard (cf. ARIB STDB-24 version 1.1, p282), the information about the start point of the layout of the subordinate element is given as Left: distance (the number of pixels) from the left edge of the box of the superordinate element and Top: distance (the number of pixels) from the upper edge of the box of the superordinate element. The information about the size of the layout of the subordinate element is given as Width: width (the number of pixels) and Height: height (the number of pixels). The coordinate system of the present apparatus is also defined in similar fashion.

Supposing the layout is changed into the multi-window display to convert (or scale down) the resolution at a magnification ratio of (1/M) (M>0) in the horizontal direction and at a magnification ratio of (1/N) (N>0) in the vertical direction and change the position from the origin (0, 0) to a movement offset position (Xoffset,Yoffset), the coordinate transformation upon the layout change of the data telecast window is effected as shown in the figure provided on the lower side of FIG. 9, thereby implementing scale-down and movement display.

At this time, the coordinate transformation of the superordinate element results in moving the start point to the coordinates (Xoffset,Yoffset) and converting the size into (H)/M horizontal and (V)/N vertical.

The coordinate transformation of the subordinate element is carried out according to Equations (1) to (4) below.

$$\text{Top}' = Y\text{offset} + \text{Top}/N \qquad (1)$$

$$\text{Left}' = X\text{offset} + \text{Left}/M \qquad (2)$$

$$\text{Width}' = \text{Width}/M \qquad (3)$$

$$\text{Height}' = \text{Height}/N \qquad (4)$$

The control part 15 transforms each element according to the above equations and issues a redrawing command to the image drawing part 18 whereupon it can present the scaled-down window of the data telecast shown in FIG. 6. Concerning the character size, however, the character fonts stored in the ROM 16 have to be properly transformed in agreement with the scale-down rate.

After this, it is determined whether the character size is not more than a predetermined size (step S205). When the character size is equal to or less than the predetermined size, i.e., when the characters are judged indiscernible, presentation change processing of the data telecast window is carried out in processing at a step being a feature of the present embodiment (step S206). It is then determined whether the end of the data telecast is requested (step S207). When the end of the data telecast is requested, the CPU moves to the processing at step S209. When the end of the data telecast is not requested, it is then determined whether the multi-window display layout is changed (step S208). When the multi-window display layout is changed, the CPU returns to the processing at step S201. When it is not changed on the other hand, the CPU returns to the processing at step S206.

As described above, the presentation change processing at step S206 is repeatedly carried out unless step S207 results in determination of the end of the data telecast and unless step S208 results in change of the multi-window display layout.

Figure 10:
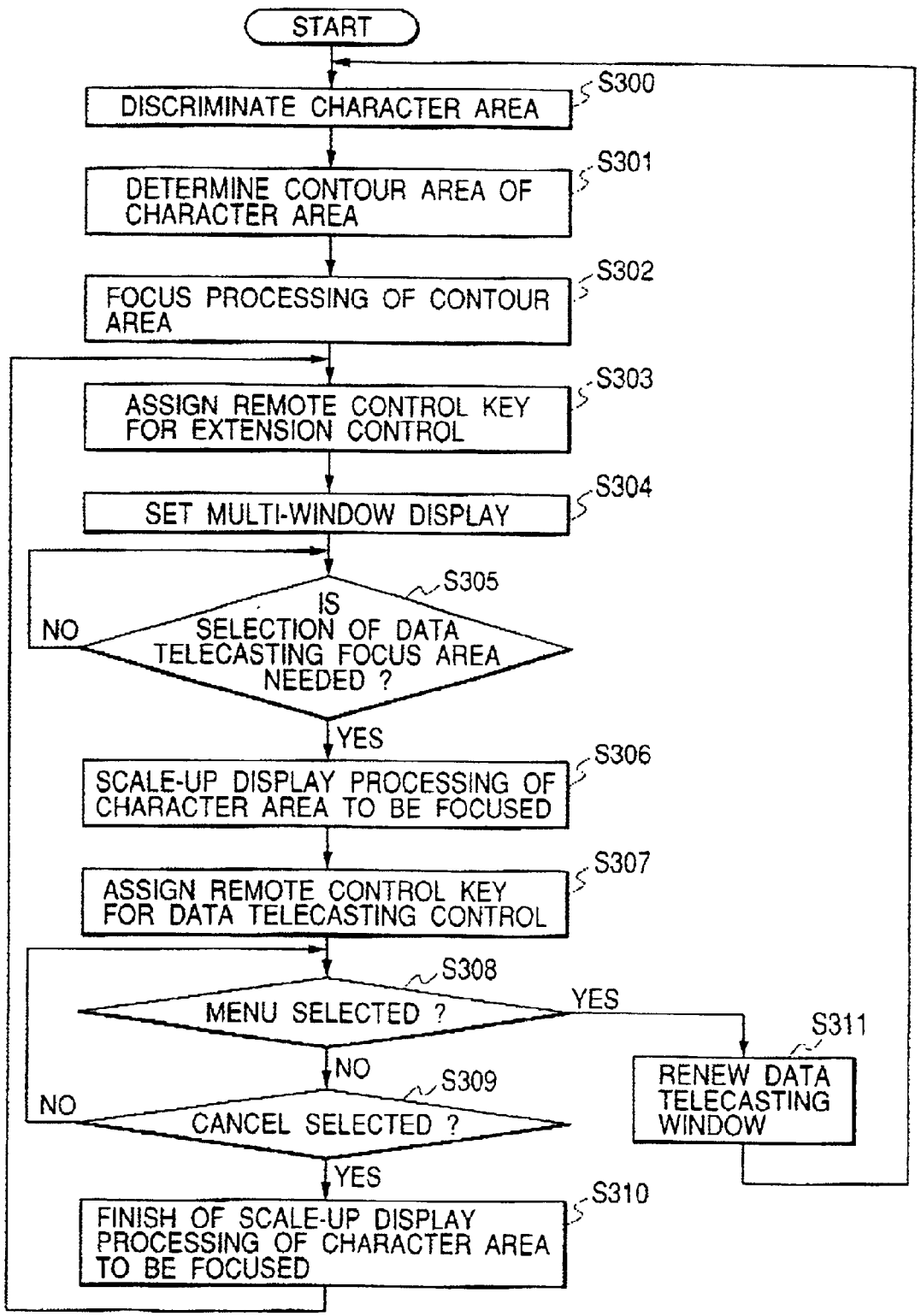
FIG. 10 is a flowchart showing a processing procedure of change in presentation of the data telecasting window at step S206.

FIG. 10 is a flowchart showing the processing procedure of the presentation change of the data telecast window at step S206. First, the character area is discriminated (step S300). Since the control part 15 recognizes the layout information of the data telecast window (the information after the layout change at step S204 of FIG. 7) and the attributes of the respective elements, the discrimination processing of the character area can be performed relatively easily. In the presentation example of FIG. 5, the elements of the menu buttons and the character data part are judged to be character areas.

Figure 11:
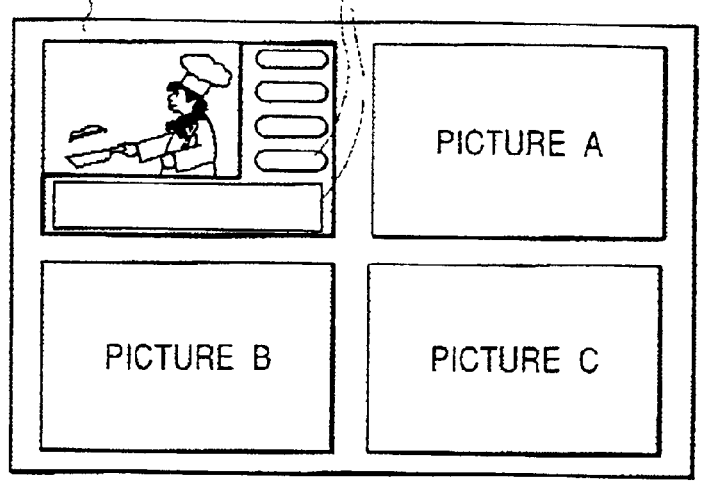
FIG. 11 is a diagram showing an image in which focus processing is effected on a contour area of a character area in a data telecasting window.

A contour area is determined for the character areas (step S301). In this determination processing of the contour area for the character areas, the contour area is selected so as to embrace all the character areas; in the presentation example of FIG. 5, the contour area is a surrounded area in a reverse L shape. Further, focus processing is effected on the contour area (step S302). FIG. 11 is a figure showing an image in which the focus processing is effected on the contour area of the character areas in the data telecast window. A characteristic presentation method herein is that indiscernible character data is not displayed and that a focus color is set by using the same color as either of the color buttons consisting of the four colors (blue, red, green, and yellow) of the ARIB spec of FIG. 8. In the example of FIG. 11, the focus color is set red.

Then the CPU assigns the remote controller keys for control of data telecasting to those for extension control (step S303). This means that the remote controller keys for control of data telecasting (the direction key buttons 30, determination button 31, and cancel button 32, and the color buttons 35 of the four colors (blue, red, green, and yellow) of the ARIB spec used in only the data telecasting) and others are assigned to extension control keys in a contour focus presentation state.

Namely, the remote-controller-associated script in the data telecasting is ignored and replaced by a characteristic control script. In this state, the multi-window display setting is carried out, thereby presenting the display of FIG. 11 (step S304).

Then the CPU stays in a wait state before the user selects the focus area of data telecasting (step S305). Specifically, the selection is implemented when the user depresses the red button out of the color buttons 35. When correspondence is made between the color button and the focus color in this way, uniformity is given to the remote controller operation in the control of the data telecasting window, thereby implementing the simple operation.

Figure 12:
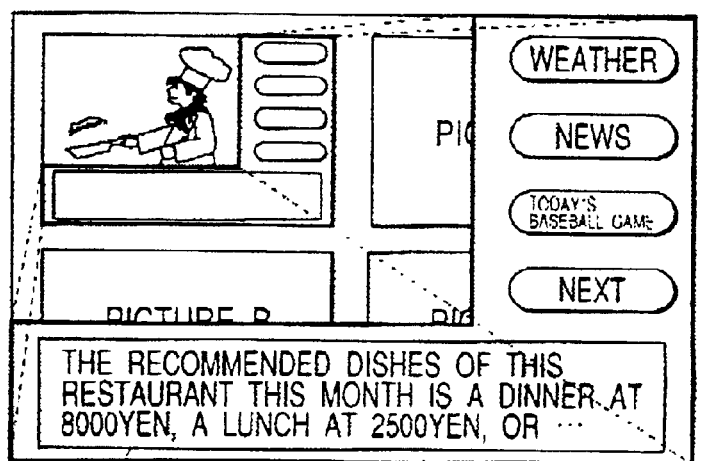
FIG. 12 is a diagram showing an image of a contour area displayed in a scale-up state.

When the focus area is selected, the CPU performs scale-up display processing of the focused character area (step S306). FIG. 12 is a diagram showing an image of the contour area displayed in a scale-up state. A scale-up method at this time can be either a method of displaying the character area back in the original size of the data telecasting window, as shown in FIG. 12, or a method of scaling up the character areas to an intermediate size enough for easy recognition of the character size in order to minimize overlapping portions of the enlarged area over the picture source windows of multi-window display. In either case, on the occasion of carrying out this scale-up display processing, the control part 15 changes the layout of the character areas into one after the desired scale-up according to the coordinate transformation represented by aforementioned Eqs (1) to (4). The present embodiment is characterized in that the layout is loyally reproduced so as to prevent the standardized presentation of data telecasting from being disturbed, as much as possible.

In this scale-up display state, the remote controller keys for control of data telecasting are again assigned to those for normal control (step S307). Namely, the characteristic control script associated with the remote controller is returned to the remote-controller-associated script in the normal data telecasting. This permits the user to select a menu by operation of the remote controller in much the same manner as the menu selection of the normal data telecasting, over the menu buttons in the enlarged character area.

It is then determined whether a menu is selected (step S308). When a menu is selected, the CPU renews the data telecasting window (step S311) and returns to the processing at step S300. When no menu is selected on the other hand, it is determined whether a cancel mode is selected on the cancel button 32 of the remote controller 20 (step S309). When the cancel mode is not selected, the CPU returns to the processing at step S308. When the cancel mode is selected on the other hand, the CPU terminates the scale-up display processing of the focused character area (step S310) and returns to step S303 to go back into the contour focus presentation state of the character areas in the data telecasting window of FIG. 11.

As described above, the present embodiment can implement the presentation processing with improved discernibility of characters during the multi-window display of data telecasting.

Second Embodiment

In the first embodiment the contour area was determined so as to embrace the control elements of the menu buttons and the like and the text element of only text information, which were the separate character areas, all together, but it can be an extremely large area, depending upon the layout configuration of the presentation window of the data telecasting. In this case, when the separate character areas are scaled up, the enlarged character areas can conceivably overlap with the windows of the other picture sources displayed in the other multi-window display, which will heavily degrade the visibility of the other picture sources. In order to prevent it, an improvement is made by a further method in the second embodiment. Since the basic processing procedures are similar to those in the first embodiment, only differences will be described below herein.

On the occasion of determining the contour area for the character areas at step S301 of FIG. 10, contour areas are determined separately for the control elements of the menu buttons and the like and for the text element of only text information in the second embodiment. Since the control part 15 can identify the difference of attributes and the layout information, it can perform this processing relatively easily.

Figure 13:
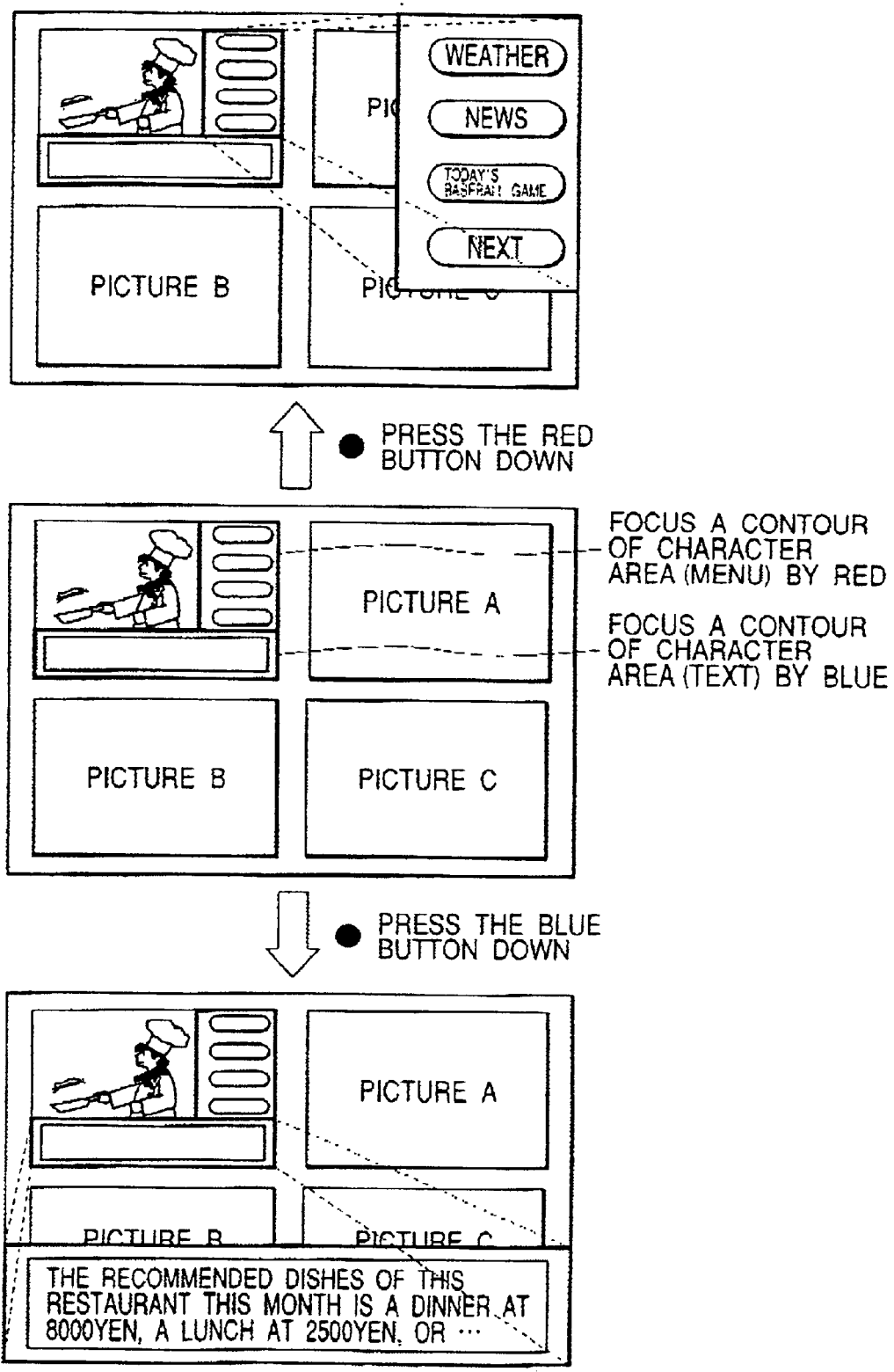
FIG. 13 is a diagram showing images of focus and scale-up display in menu-text separation in the second embodiment.

At step S302, the CPU executes the focus processing over the contour areas. In this focus processing, the areas separated at step S301 are focused with respectively different colors. FIG. 13 is a diagram showing images of focus and scale-up display in separation of the menus and text in the second embodiment. A characteristic presentation method herein is that indiscernible character data is not displayed and that the focus colors are set by using the same colors as two of the color buttons of the four colors (blue, red, green, and yellow) according to the ARIB spec shown in FIG. 8, as in the first embodiment. In the center figure of FIG. 13, the menu area is set red and the text area blue.

When the user presses the red button out of the color buttons 35 at step S305, the CPU performs the scale-up display processing of only the menu area of the focused character area, as shown in the figure on the upper side of FIG. 13, at step S306. When the user presses the blue button out of the color buttons 35 at step S305, the CPU performs the scale-up display processing of only the text area of the focused character area, as shown in the figure on the lower side of FIG. 13, at step S306.

When either of the character areas is scaled up in this way, it is feasible to reduce overlapping regions over the windows of the other picture sources displayed in the other multiple windows.

Third Embodiment

In the second embodiment the focus processing was carried out using the different colors separately for the control elements of the menu buttons and the like and for the text element of only the text information, but in this display condition the user might fail to determine whether the focused area is the menu area or the text area.

Figure 14:
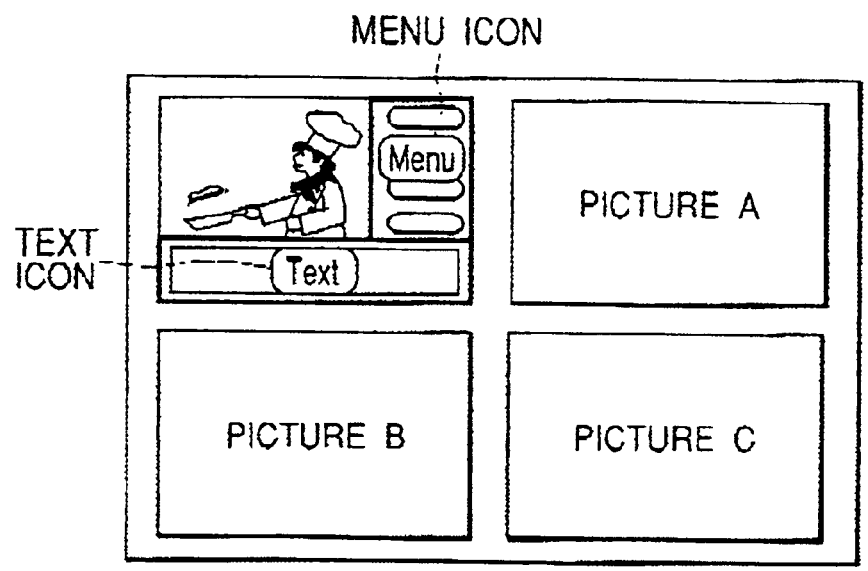
FIG. 14 is a diagram showing an image of focus display with menu and text icons in the third embodiment.

FIG. 14 is a diagram showing an image of focused display with additional menu and text icons in the third embodiment. The control part 15 draws a Menu icon indicating the menu area and a Text icon indicating the text area, in cooperation with the image drawing part 18, whereby the user can readily determine whether the focused area is the menu area or the text area, thus improving controllability on the occasion of the user's selecting a focused area.

Fourth Embodiment

In the first and second embodiments, the character area under scale-up display can spread over an extremely large region, depending upon the layout configuration of the presentation window of data telecasting. In this case, the character area under the scale-up display might overlap largely over the windows of the other picture sources displayed in the other multiple windows, which will heavily degrade the visibility of the other picture sources. In order to solve it, an improvement is made by a further method in the fourth embodiment.

Figure 15:
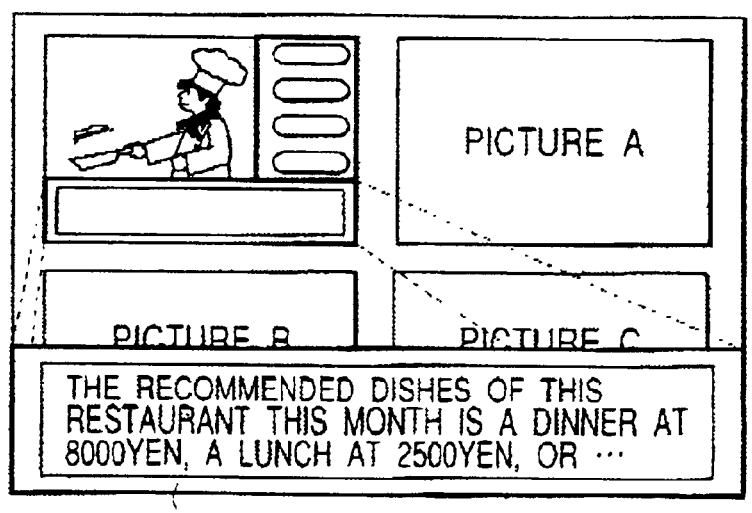
FIG. 15 is a diagram showing an image in scale-up display of a contour area in the fourth embodiment.

FIG. 15 is a diagram showing an image in scale-up display of the contour area in the fourth embodiment. In the fourth embodiment, the enlarged area and the picture areas of the multiple windows are displayed in an alpha-blended form. The control part 15 draws an image with the alpha value on the GUI+α plane in the shared memory 10 in cooperation with the image drawing part 18, whereby the synthesizing part 12 executes alpha blending, as described in the first embodiment.

This is able to improve the visibility of the multi-window picture sources in the scale-up state of the character area ever if the enlarged character area overlaps in part over the windows of the other picture sources displayed in the other multiple windows.

Fifth Embodiment

In the first and second embodiments, if the focused area is instantaneously scaled down (or up) to the original size after selection thereof, it will be hard for the user to judge which character area is scaled up. For paying regard to the standardized presentation of the broadcast service provider, it is desirable to clearly show the correspondence to the original layout.

For this reason, a stepped scale-up over a certain transition time is carried out on the occasion of returning (or scaling up) the character area to the original size in the fifth embodiment. Specifically, the stepped scale-up is represented by Equations (5) to (7) below, where in the scale-up display processing of the focused character area at step S306 of FIG. 10, the transition time for the stepped scale-up is defined as T (s), the refresh rate of the display device 14 F (Hz), a magnification rate of the character area before a scale-up M (times), and a magnification rate of the character area after a scale-up N (times).

$$\text{The number of scale-up steps} = T \times F \quad (5)$$

$$\text{Magnification rate of scale-up step} = (M-N)/\text{the number of scale-up steps} \quad (6)$$

The result of addition of the scale-up step magnification rate of Eq (6) to the current magnification rate at every step indicated by Eq (5) gives the next scale-up magnification rate, as represented by Eq (7).

$$\text{Next scale-up magnification rate} = \text{current scale-up magnification rate} + \text{scale-up step magnification rate} \quad (7)$$

Namely, the stepped scale-up within the determined transition time can be implemented by carrying out the scale-up step at the magnification rate of Eq (6) by the number of scale-up steps of Eq (5) in synchronism with the vertical synchronizing signal of the display device 14.

Figure 16:
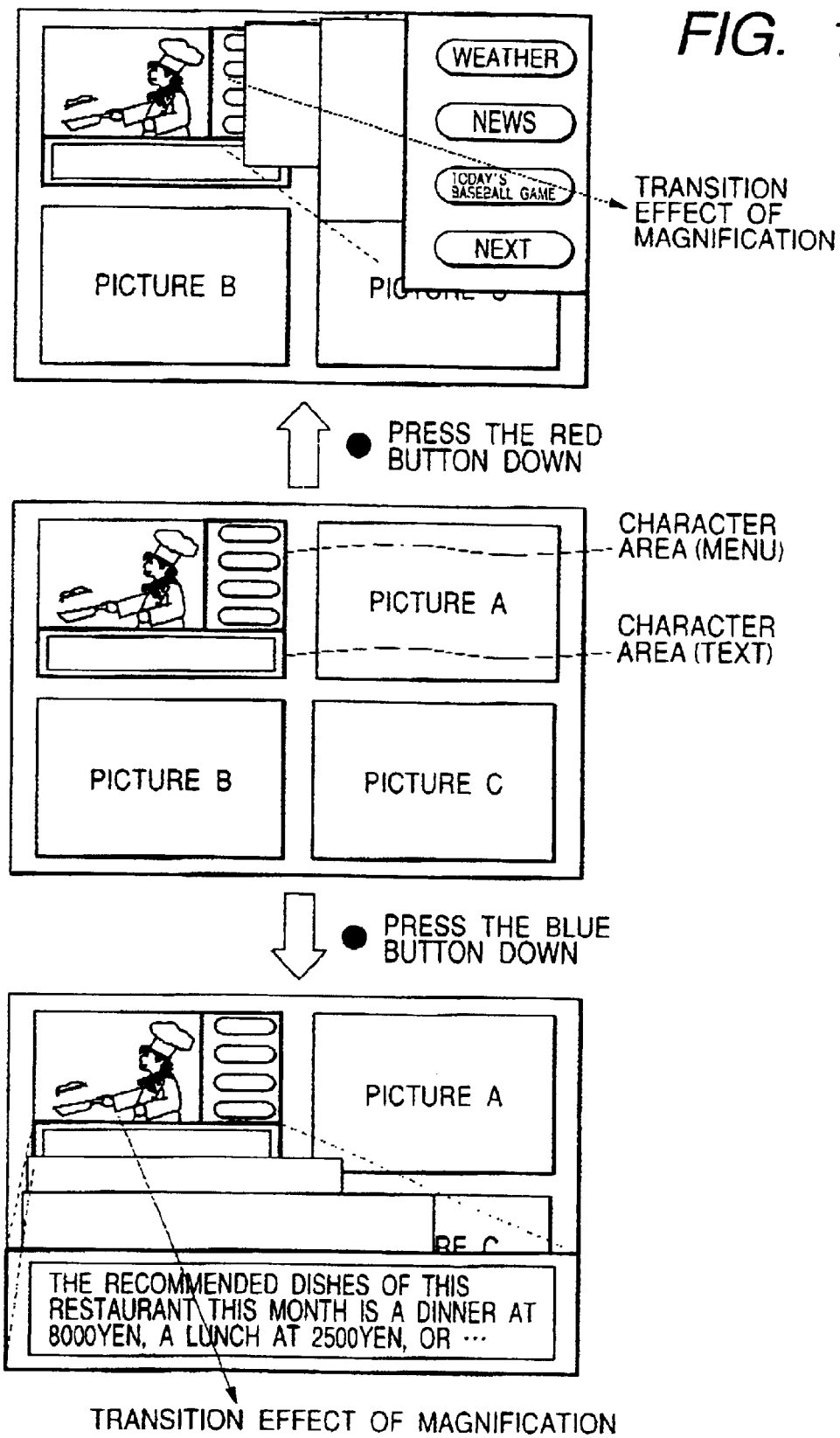
FIG. 16 is a diagram showing images of transition effect in scale-up display of contour areas in the fifth embodiment.

The control part 15 draws images of the character area at different scale-up magnification rates on the GUI+α plane in the shared memory 10 in cooperation with the image drawing part 18. FIG. 16 is a diagram showing images of the transition effect in the scale-up display of the contour areas in the fifth embodiment. By this, the stepped scale-up effect can be achieved in a stepwise manner.

In this way, the user can readily discriminate which character area is scaled tip in the scale-up display of the character area.

Sixth Embodiment

In the second embodiment, the separation of the character areas was implemented by determining the contour areas separately for the respective attributes, e.g., for the control elements of the menu buttons and the like and for the text element of only text information, but the contour area can spread over a considerably large area, depending upon the layout configuration of the presentation window of data telecast.

Figure 17:
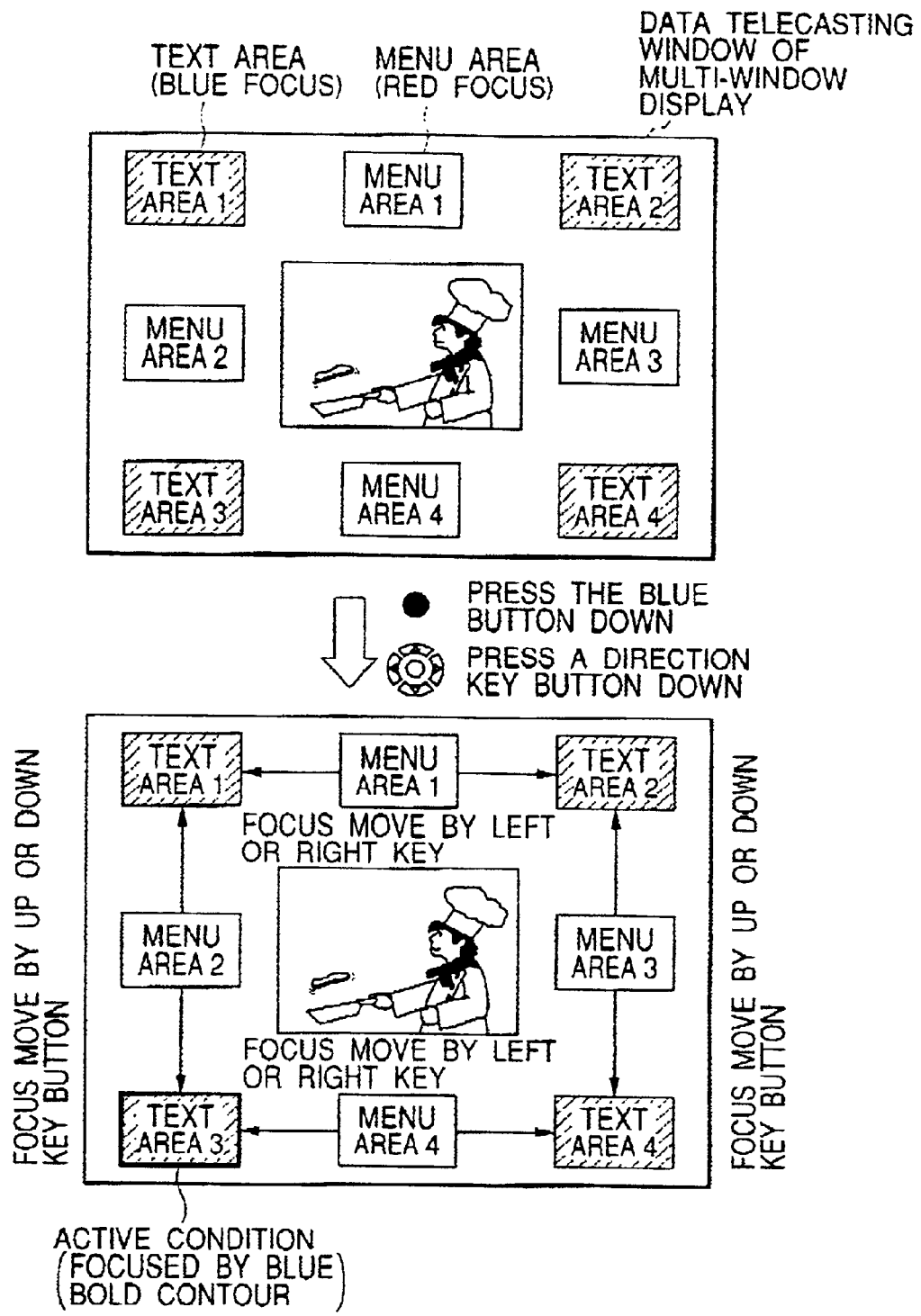
FIG. 17 is a diagram showing images of movement of contour focus on a character area in the sixth embodiment.

FIG. 17 is a diagram showing images of contour focus movement of character areas in the sixth embodiment. The window shown on the upper side of FIG. 17 is one picked up from the data telecast window part displayed in a scale-down state as one window of the multi-widow display, similar to FIG. 6. For example, where text areas and menu areas are scattered over the presentation window of data telecasting, as shown in the window on the upper side of FIG. 17, it is difficult to group the text areas and the menu areas according to their attributes and determine contour areas for respective groups. If this were forcibly done to determine the contour areas and scale up the separate character areas, the scale-up character area would largely overlap with the windows of the other character sources displayed in the other multiple windows, which could heavily degrade the visibility of the other picture sources.

In order to avoid it, an improvement is made by a further method in the sixth embodiment. Since the basic processing procedures are similar to those in the first embodiment, only differences will be described below.

In the determination of the contour area for the character areas at step S301 of FIG. 10, the sixth embodiment is arranged to separate the character areas into the control elements of the menu buttons and the like and the text elements of only text information and determine areas for the respective elements by dividing the character areas into a size capable of accommodating each element in a rectangular area. In the window shown on the upper side of FIG. 17, each of the text area and the menu area is divided into four areas.

Since the control part 15 can identify the difference of attributes and the layout information, it can perform this processing relatively easily. At step S302, the CPU performs the focus processing on the contour areas. This focus processing is carried out to focus the groups of the areas separated at step S301, with their respective colors different from each other and focus each area group of the same attribute with the same color. This image is presented in the window shown on the upper side of FIG. 17.

A characteristic presentation method herein is that indiscernible character data is not displayed and that the focus colors are set by using the same colors as two of the color buttons of the four colors (blue, red, green, and yellow) according to the ARIB spec in FIG. 8, as In the first embodiment. In FIG. 17, the various menu areas are set red and the various text areas blue.

Figure 18:
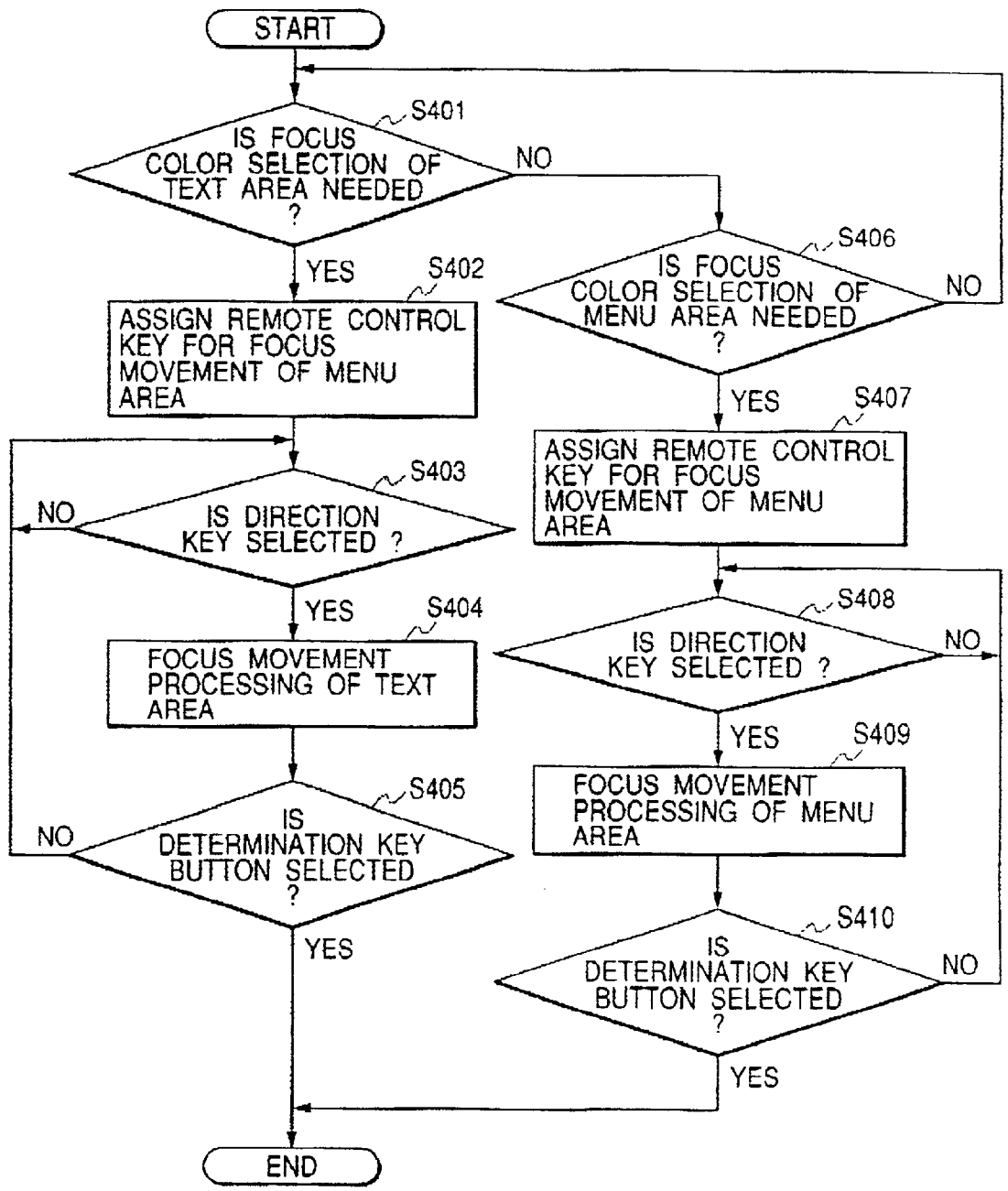
FIG. 18 is a flowchart showing a processing procedure of selection of a focus area in the movement of contour focus on a character area.

In this state, the control part carries out the processing at step S305, which is a feature of the sixth embodiment. FIG. 18 is a flowchart showing a selection processing procedure of a focused area during contour focus movement of the character areas. This processing program is stored in the ROM 16 and is executed by the CPU in the control part 15.

First, it is determined whether the focus color for the text areas is selected (step S401). When the user selects the focus color of the text areas by pressing the blue button out of the color buttons 35, the remote control keys are assigned to those for focus movement of the text areas (step S402). Specifically, the remote controller keys are assigned so as to be able to move the focus among the four separate text areas with the direction key buttons 30.

The CPU awaits user's selection of a direction key (step S403). When the user selects a direction key, the focus is moved to the text area of the designated direction key (step S404). On the window shown on the lower side of FIG. 17, left and right movement is implemented by the left and right keys out of the direction keys, while the up and down movement by the upper and lower keys out of the direction keys. It is noted that the correspondence between the movement directions and the direction keys is not limited to this method.

The focus on the area of the focus movement destination is made discernible from the focus color before the focus movement and turns the area into an active state in which it is presently selected. On the window shown on the lower side of FIG. 17, the focus in the active state is indicated by blue bold focus. It is also noted that the focus method of this active state is not limited to this.

After this focus movement, it is determined whether the user selects an area desired to display in the scale-up state by depressing the determination button 31 (step S405). When an area desired to display in the scale-up state is selected, the processing is terminated. When it is not selected on the other hand, the CPU returns to the processing at step S403.

After this, the CPU carries out the aforementioned scale-up display processing of the focused area at step S306 of FIG. 10. This scale-up display can be done in a minimum area in which the user desires to scale up the focused area.

When the focus color of the text areas is not selected at step S401 on the other hand, the CPU determines whether the focus color of the menu areas is selected (step S406). When the focus color of the menu areas is not selected, the CPU returns to the processing at step S401.

When the focus color of the menu areas is selected on the other hand, the CPU carries out the processing at and after step S407, and the focus movement processing of menu areas at these steps S407 to S410 is similar to the processing at steps S402 to S405.

Namely, when the user selects the focus color of the menu areas by depressing the red button out of the color buttons 35, the remote controller keys are assigned to those for the focus movement of the menu areas (step S407).

The CPU awaits user's selection of a direction key (step S408). When the user selects a direction key, the CPU moves the focus to the text area of the designated direction key (step S409). After the movement of focus, it is determined whether the user selects an area desired to display in the scale-up state by depressing the determination button 31 (step S410). When the user selects an area desired to display in the scale-up state, the processing is terminated. When the user does not select any area on the other hand, the CPU returns to the processing at step S408.

This can decrease the overlapping regions over the windows of the other picture sources displayed in the other multiple windows, in the scale-up state of the character area, independent of the layout of the data telecast.

The above described the embodiments of the present invention, but it is noted that the present invention is not limited to the configurations of these embodiments and can also be applied to any structure that can achieve the functions stated in the scope of claims or the functions in the configurations of the embodiments.

For example, the above embodiments showed the structure in which one display device was able to display a synthetic screen of multiple windows, based on the predetermined layout of the totally four independent picture sources including the two independent telecast picture sources and two independent external picture input sources, but the number of picture sources in the present invention can be any number greater than or smaller than four. The requirement is inclusion of at least one telecast picture source and there are no specific restrictions on types of picture sources combined therewith.

The above embodiments showed the cases of receiving satellite broadcasting, but the present invention can also be applied similarly to reception of broadcasting through ground waves, optical fiber cables, and so on.

It is also needless to mention that the present invention can also be applied to a case wherein the invention is achieved by supplying programs from a recording medium (memory) storing program codes of software for implementing the functions of the aforementioned embodiments, to the apparatus. In this case, the program codes themselves read out of the memory implement the novel functions of the present invention, so that the programs and the storage medium storing the programs constitute the present invention.

In the above embodiments, the program codes indicated in the flowcharts of FIG. 2, FIG. 7, FIG. 10, and FIG. 18 are stored in the ROM being a memory. The memory for supplying the program codes can be, for example, either of a floppy disk, a hard disk, a CD-ROM, a CD-R, a DVD, a nonvolatile memory card, and so on.

In addition to the case wherein the functions of the aforementioned embodiments are implemented by carrying out the program codes read out by a computer, it is a matter of course that the invention also embraces a case wherein the functions of the aforementioned embodiments are implemented in such a way that an OS or the like operating on a computer carries out part or the whole of actual processing, based on instructions of the program codes and the processing realizes the functions of the embodiments.

Further, it is also needless to mention that the invention also embraces a case wherein the program codes read out of the memory are supplied to a CPU provided in an extension board inserted into the computer or to an extension unit connected to the computer, the CPU or the like performs part or the whole of actual processing, and the processing implements the functions of the aforementioned embodiments.

According to the present invention, when the data telecast window is displayed as one window of the multi-window display, the user can view the window with improved visibility of the character area of the data telecast and the multi-window display, without disturbing the "standardized presentation" of the data telecast window intended by the broadcasting service provider.

What is claimed is:

1. A multi-window display apparatus for combining windows corresponding to a plurality of input image data to present a multi-window display thereof, comprising:
    identifying means for identifying a character information area in one window of the windows;
    contour area extracting means for extracting a contour area of said identified character information area; and
    display changing means for changing a display mode of the character information area in said extracted contour area when said one window is displayed in a scale-down state equal to or less than a predetermined size.

2. A multi-window display apparatus according to claim 1, comprising layout changing means for changing a layout of a data telecast window as said one window when said plurality of image data is supplied from a plurality of picture sources including a data telecast,
    wherein said display changing means changes said display mode in accordance with a change of said layout.

3. A multi-window display apparatus according to claim 1, wherein said predetermined size is such a size that a character size in said character information area is equal to or less than a predetermined character size.

4. A multi-window display apparatus according to claim 2, wherein the multi-window display apparatus is applied to a data telecast receiving apparatus having a remote controller for controlling said data telecast.

5. A multi-window display apparatus according to claim 1, wherein said display changing means provides no display of character information in said contour area.

6. A multi-window display apparatus according to claim 1, wherein said display changing means changes said contour area to focus display of a color frame.

7. A multi-window display apparatus according to claim 4, wherein when said display changing means changes said contour area to focus display of a color frame, said display changing means sets the focus display of the color frame to a same color as a color button provided in said remote controller.

8. A multi-window display apparatus according to claim 4, wherein said display changing means scales the character information area in said contour area up to a predetermined character size permitting discrimination of character information, in response to an operation of said remote controller, and displays said character information area in the predetermined character size.

9. A multi-window display apparatus according to claim 8, wherein when a control element designated in said data telecast is included in said character information area in said contour area displayed in the scale-up state, said control element can be controlled by said remote controller.

10. A multi-window display apparatus according to claim 1, wherein said identifying means identifies said character information area while separating said character information area into a text element consisting of text information and a control element consisting of a menu button,
    wherein said contour area extracting means separately extracts said contour areas for the respective elements, and
    wherein said display changing means changes display modes of the contour areas for the respective elements.

11. A multi-window display apparatus according to claim 10, wherein said display changing means changes the contour area for each said element to focus display of a color frame.

12. A multi-window display apparatus according to claim 10, wherein the multi-window display apparatus is applied to a data telecast receiving apparatus having a remote controller for controlling a data telecast, wherein when said display changing means changes the contour area for each said element to focus display of a color frame, said display changing means sets the focus display of said color frame to a same color as a color button provided in said remote controller.

13. A multi-window display apparatus according to claim 10, wherein the multi-window display apparatus is applied to a data telecast receiving apparatus having a remote controller for controlling a data telecast, wherein said display changing means scales the character information area in the contour area for each said element up to a predetermined character size permitting discrimination of said character information, in response to an operation of said remote controller, and displays the character information area in the predetermined character size.

14. A multi-window display apparatus according to claim 13, wherein when the control element designated in said data telecast is included in the character information area in said contour area displayed in the scale-up state for each said element, said control element can be controlled by said remote controller.

15. A multi-window display apparatus according to claim 10, wherein said display changing means displays a character string or an icon by which the contents of the element can be visually discriminated, over the character information area in the contour area for each said element.

16. A multi-window display apparatus according to claim 8, wherein said display changing means performs alpha blending of the character information area in said contour area and a multi-window display area to present alpha-blended display.

17. A multi-window display apparatus according to claim 8, wherein when said character information area is displayed in the scale-up state, said display changing means effects stepwise scale-up transition of said character information area within a predetermined time.

18. A multi-window display apparatus according to claim 10, wherein the multi-window display apparatus is applied to a data telecast receiving apparatus having a remote controller for controlling a data telecast,
    wherein said identifying means identifies said character information area while separating said character information area into a plurality of areas for the respective elements and for each identical element, and
    wherein said display changing means changes the display mode by switching among contour areas of the plurality of separate character information areas for each said identical element, in response to an operation of the remote controller.

19. A data telecast receiving apparatus for accepting input of a plurality of image data from a plurality of picture sources including a data telecast, and combining windows corresponding to said image data to present multi-window display thereof, comprising:
    identifying means for identifying a character information area in a data telecast window;
    contour area extracting means for extracting a contour area of the character information area thus identified; and display changing means for changing a display mode of the character information area in said extracted contour area when said data telecast window is displayed in a scale-down state equal to or less than a predetermined size.

20. A multi-window display method of combining windows corresponding to a plurality of input image data to present multi-window display thereof, comprising:
- a step of identifying a character information area in a said window;
- a step of extracting a contour area of the character information area thus identified; and
- a step of changing a display mode of the character information area in the extracted contour area when the window is displayed in a scale-down state equal to or less than a predetermined size.

21. A multi-window display method according to claim 20, comprising a step of changing a layout of a data telecast window as said window when said plurality of image data is supplied from a plurality of picture sources including a data telecast,
wherein in said step of changing the display mode, said display mode is changed according to a change of said layout.

22. A multi-window display method according to claim 20, wherein said predetermined size is such a size that a character size in said character information area is equal to or less than a predetermined character size.

23. A multi-window display method according to claim 21, which is applied to a data telecast receiving apparatus having a remote controller for controlling said data telecast.

24. A multi-window display method according to claim 20, wherein in said step of changing the display mode, character information in said contour area is not displayed.

25. A multi-window display method according to claim 20, wherein in said step of changing the display mode, said contour area is changed to focus display of a color frame.

26. A multi-window display method according to claim 23, wherein in said step of changing the display mode, when said contour area is changed to focus display of a color frame, the focus display of the color frame is set to a same color as a color button provided in said remote controller.

27. A multi-window display method according to claim 23, wherein in said step of changing the display mode, the character information area in said contour area is scaled up to a predetermined character size permitting discrimination of character information, in response to an operation of said remote controller, and the character information area is displayed in the predetermined character size.

28. A multi-window display method according to claim 27, wherein when a control element designated in said data telecast is included in the character information area in said contour area displayed in the scale-up state, said control element can be controlled by said remote controller.

29. A multi-window display method according to claim 20, wherein in said step of identifying, said character information area is identifying while being separated into a text element consisting of text information and a control element consisting of a menu button,
wherein in said step of extracting the contour area, said contour area is separately extracted for each said element, and
wherein in said step of changing the display mode, the display mode of the contour area for each said element is changed.

30. A multi-window display method according to claim 29, wherein in said step of changing the display mode, the contour area for each said element is changed to focus display of a color frame.

31. A multi-window display method according to claim 29, which is applied to a data telecast receiving apparatus having a remote controller for controlling a data telecast, wherein in said step of changing the display mode, when the contour area for each said element is changed to focus display of a color frame, the focus display of said color frame is set to a same color as a color button provided in said remote controller.

32. A multi-window display method according to claim 29, which is applied to a data telecast receiving apparatus having a remote controller for controlling a data telecast, wherein in said step of changing the display mode, said character information area in the contour area for each said element is scaled up to a predetermined character size permitting discrimination of said character information, in response to an operation of the remote controller, and is displayed in the predetermined character size.

33. A multi-window display method according to claim 32, wherein when a control element designated in said data telecast is included in the character information area in said contour area displayed in the scale-up state for each said element, said control element can be controlled by said remote controller.

34. A multi-window display method according to claim 29, wherein in said step of changing the display mode, a character string or an icon, by which the contents of the element can be visually discriminated, is displayed over the character information area in the contour area for each said element.

35. A multi-window display method according to claim 27, wherein in said step of changing the display mode, alpha blending of the character information area in said contour area and a multi-window display area is effected to present alpha-blended display.

36. A multi-window display method according to claim 27, wherein in said step of changing the display mode, when said character information area is displayed in the scale-up state, stepwise scale-up transition is implemented within a predetermined time.

37. A multi-window display method according to claim 29, wherein the method is applied to a data telecast receiving apparatus having a remote controller for controlling a data telecast,
wherein in said step of identifying, said character information area is identified while being separated into a plurality of areas for the respective elements and for each identical element, and
wherein in said step of changing the display mode, the display mode is changed by switching among contour areas of the plurality of separate character information areas for each said identical element in response to an operation of said remote controller.

38. A memory storing a program code for implementing the multi-window display method as set forth in claim 20.

39. A program comprising a program code for implementing the multi-window display method as set forth in claim 20.

* * * * *